(12) United States Patent
Murata et al.

(10) Patent No.: US 11,508,327 B2
(45) Date of Patent: Nov. 22, 2022

(54) LIQUID CRYSTAL DISPLAY DEVICE

(71) Applicant: Sharp Kabushiki Kaisha, Sakai (JP)

(72) Inventors: Koji Murata, Sakai (JP); Hidefumi Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/529,315

(22) Filed: Nov. 18, 2021

(65) Prior Publication Data
US 2022/0157271 A1    May 19, 2022

(30) Foreign Application Priority Data

Nov. 19, 2020 (JP) .............................. JP2020-192502

(51) Int. Cl.
| | |
|---|---|
| *G09G 3/36* | (2006.01) |
| *G02F 1/1362* | (2006.01) |
| *G02F 1/1337* | (2006.01) |
| *G02F 1/137* | (2006.01) |
| *G02F 1/1343* | (2006.01) |

(52) U.S. Cl.
CPC .......... *G09G 3/3648* (2013.01); *G02F 1/137* (2013.01); *G02F 1/1337* (2013.01); *G02F 1/1362* (2013.01); *G02F 1/134309* (2013.01); *G09G 2320/028* (2013.01); *G09G 2358/00* (2013.01)

(58) Field of Classification Search
CPC ............. G02F 1/1337; G02F 1/134309; G02F 1/1362; G02F 1/137; G02F 1/134; G09G 3/36; G09G 5/00; G06F 3/038
See application file for complete search history.

(56) References Cited

U.S. PATENT DOCUMENTS

| | | | |
|---|---|---|---|
| 2007/0040780 A1 | 2/2007 | Gass et al. | |
| 2007/0146606 A1 | 6/2007 | Yamashita | |
| 2011/0012924 A1 | 1/2011 | Gass et al. | |
| 2012/0056914 A1 | 3/2012 | Gass et al. | |
| 2012/0147026 A1* | 6/2012 | Gass ................... | G09G 3/3611 345/589 |

(Continued)

FOREIGN PATENT DOCUMENTS

| | | |
|---|---|---|
| JP | 2007-178907 A | 7/2007 |
| JP | 2011-253206 A | 12/2011 |

*Primary Examiner* — Pegeman Karimi
(74) *Attorney, Agent, or Firm* — Keating & Bennett, LLP

(57) ABSTRACT

Provided is a liquid crystal display device including: a liquid crystal panel including display units for displaying an image using a veil-view function; and a control circuit. The display units each include a pair of sub-pixels including a first sub-pixel and a second sub-pixel. The liquid crystal panel sequentially includes an active matrix substrate, a first alignment film, a liquid crystal layer containing liquid crystal molecules, a second alignment film, and a counter substrate. The active matrix substrate includes first and second electrodes that are stacked via a first insulating layer or that face each other on the first substrate. At least one of the first or second electrode is disposed for each first sub-pixel and for each second sub-pixel. The counter substrate includes a third electrode. The control circuit is configured to switch between application of alternating voltage and application of constant voltage to the third electrode.

4 Claims, 15 Drawing Sheets

(56) References Cited

U.S. PATENT DOCUMENTS

2015/0346564 A1\* 12/2015 Moriwaki ......... G02F 1/136286
                                                            349/138
2019/0163024 A1\* 5/2019 Tominaga ......... G02F 1/134309
2021/0149511 A1\* 5/2021 Chung ................. G06F 3/0416

\* cited by examiner

LIQUID CRYSTAL DISPLAY DEVICE

CROSS-REFERENCE TO RELATED APPLICATIONS

The present application claims priority under 35 U.S.C. § 119 to Japanese Patent Application No. 2020-192502 filed on Nov. 19, 2020, the contents of which are incorporated herein by reference in their entirety.

BACKGROUND OF THE INVENTION

Field of the Invention

The present invention relates to a liquid crystal display device.

Description of Related Art

Liquid crystal display devices are display devices utilizing a liquid crystal composition to display images. In a typical display mode thereof, voltage is applied to a liquid crystal composition sealed between paired substrates such that the alignment of liquid crystal molecules in the liquid crystal composition is changed according to the applied voltage, whereby the amount of light passing through the paired substrates is controlled. Such liquid crystal display devices have advantageous features such as thin profile, light weight, and low power consumption, and are therefore used in a variety of fields.

Studies to enhance the viewing angle characteristics of liquid crystal display devices have been made such that the same image can be observed regardless of whether the viewing angle range is narrow or wide. Meanwhile, in terms of ensuring privacy, studies to allow an image to be observable in a narrow viewing angle range and to allow the image to be less observable in a wide viewing angle have been made. For example, JP 2007-178907 A discloses a liquid crystal display device having an FFS structure generating a lateral electric field between a first electrode and a second electrode on a first substrate, wherein a third electrode for generating a vertical electric field with the first electrode and the second electrode is arranged on a second substrate facing the first substrate. Here, the liquid crystal display device is meant to control the vertical electric field for viewing angle control.

JP 2011-253206 A discloses a liquid crystal display device including a liquid crystal display panel, first and second sets of regions in the liquid crystal display panel, and circuitry being adapted to apply an electric field in first and second different ways in the first and second sets of regions respectively, wherein a display can be switched between a public mode and a private mode, and a masking image is displayed in the private mode. Herein, this technique is referred to as a veil-view technique (function).

BRIEF SUMMARY OF THE INVENTION

The liquid crystal display device disclosed in JP 2007-178907 A can improve the privacy in observation from the left-right directions, but does not ensure sufficient privacy in terms of observation from an oblique direction. The liquid crystal display device disclosed in JP 2011-253206 A cannot ensure sufficient privacy in terms of observation from the left-right directions of its display screen, although making an image difficult to observe from a direction oblique to its display screen.

In response to the above issues, an object of the present invention is to provide a liquid crystal display device that ensures excellent privacy by making its liquid crystal panel less observable from the left-right and oblique directions.

(1) One embodiment of the present invention is directed to a liquid crystal display device including: a liquid crystal panel including display units for displaying an image using a veil-view function; and a control circuit configured to control image signals input to the display units, the display units each including, among sub-pixels arranged in a matrix pattern in an in-plane direction of the liquid crystal panel, a pair of sub-pixels arranged adjacent to each other, one of the sub-pixels being a first sub-pixel selected from odd-number rows and the other being a second sub-pixel selected from even-number rows, the liquid crystal panel sequentially including an active matrix substrate, a first alignment film, a liquid crystal layer containing liquid crystal molecules, a second alignment film, and a counter substrate, the active matrix substrate including a first substrate, and a first electrode and a second electrode that are stacked via a first insulating layer or that face each other on the first substrate, at least one of the first electrode or the second electrode being disposed for each first sub-pixel and for each second sub-pixel, the counter substrate including a second substrate and a third electrode, the control circuit being configured to switch between application of alternating voltage and application of constant voltage to the third electrode.

(2) In an embodiment of the present invention, the liquid crystal display device includes the structure (1), the control circuit is configured to switch between a first display mode that allows a first image to be observable in a narrow viewing angle range including a normal direction of the liquid crystal panel and a second display mode that allows the first image to be observable in a wide viewing angle range including the narrow viewing angle range, and the control circuit is configured to apply an alternating voltage to the third electrode in the first display mode and a constant voltage common to the first electrode or the second electrode to the third electrode in the second display mode.

(3) In an embodiment of the present invention, the liquid crystal display device includes the structure (2), and the control circuit in the first display mode inputs different image signals to the first sub-pixel and the second sub-pixel so as to allow a second image, different from the first image, to be observed in the wide viewing angle range.

(4) In an embodiment of the present invention, the liquid crystal display device includes any of the structures (1) to (3), and the counter substrate includes a dielectric layer between the third electrode and the second alignment film.

The present invention can provide a liquid crystal display device that ensures excellent privacy by making its liquid crystal panel less observable from the left-right and oblique directions.

DETAILED DESCRIPTION OF THE INVENTION

Hereinafter, an embodiment of the present invention is described. The present invention is not limited to the following embodiment, and the design of the present invention can be modified as appropriate within the range satisfying the configuration of the present invention. Hereinafter, like reference signs refer to the same portions or the portions having the same function throughout the drawings, and redundant description of already described portions is omitted as appropriate. The modes in the present invention may appropriately be combined within the gist of the present invention.

The liquid crystal display device according to an embodiment of the present invention includes: a liquid crystal panel including display units for displaying an image using a veil-view function; and a control circuit configured to control image signals input to the display units, the display units each including, among sub-pixels arranged in a matrix pattern in an in-plane direction of the liquid crystal panel, a pair of sub-pixels arranged adjacent to each other, one of the sub-pixels being a first sub-pixel selected from odd-number rows and the other being a second sub-pixel selected from even-number rows, the liquid crystal panel sequentially including an active matrix substrate, a first alignment film, a liquid crystal layer containing liquid crystal molecules, a second alignment film, and a counter substrate, the active matrix substrate including a first substrate, and a first electrode and a second electrode that are stacked via a first insulating layer or that face each other on the first substrate, at least one of the first electrode or the second electrode being disposed for each first sub-pixel and for each second sub-pixel, the counter substrate including a second substrate and a third electrode, the control circuit being configured to switch between application of alternating voltage and application of constant voltage to the third electrode.

Figure 1:
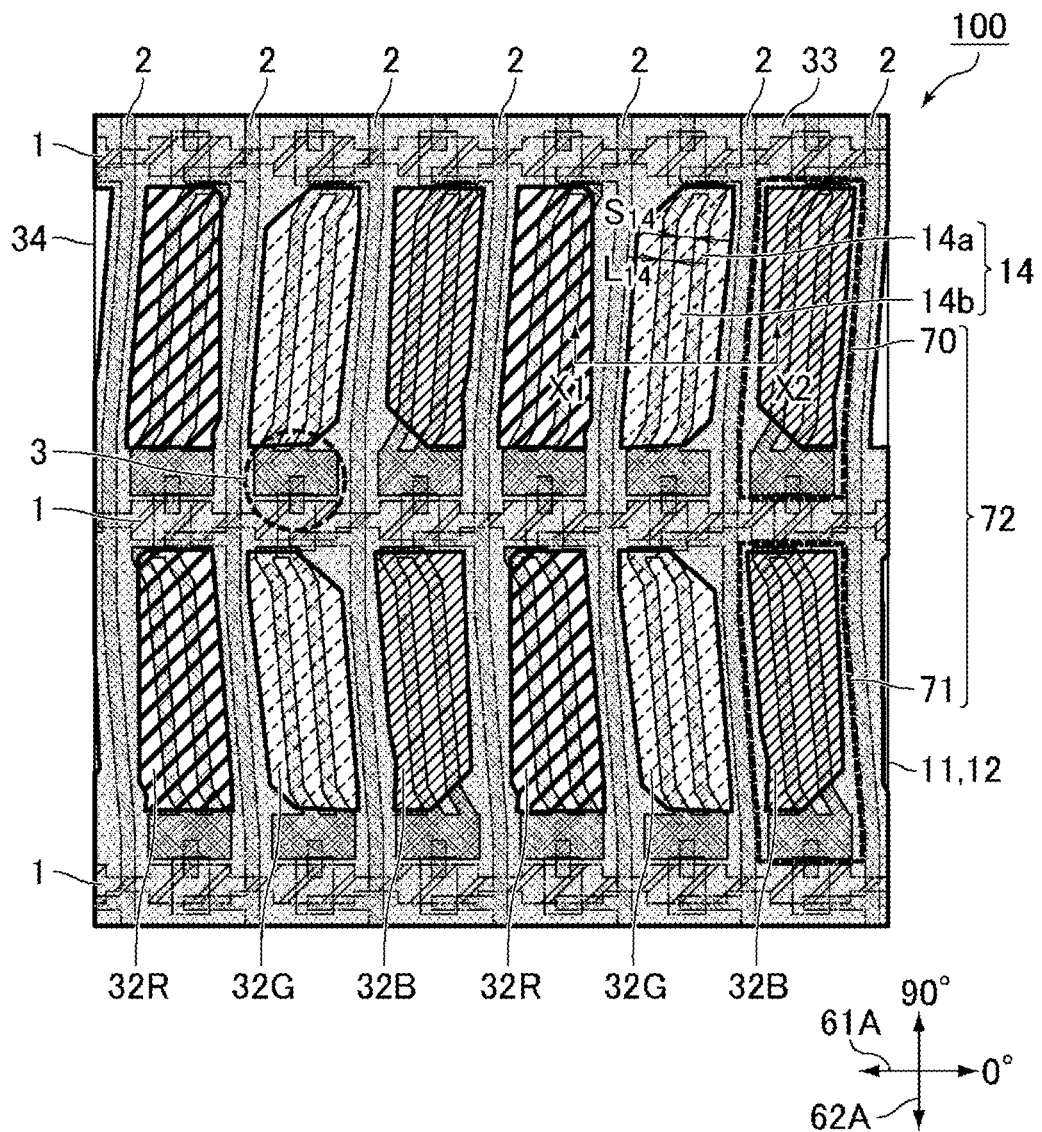
FIG. 1 is a schematic plan view of an exemplary liquid crystal display device according to an embodiment.
Figure 2:
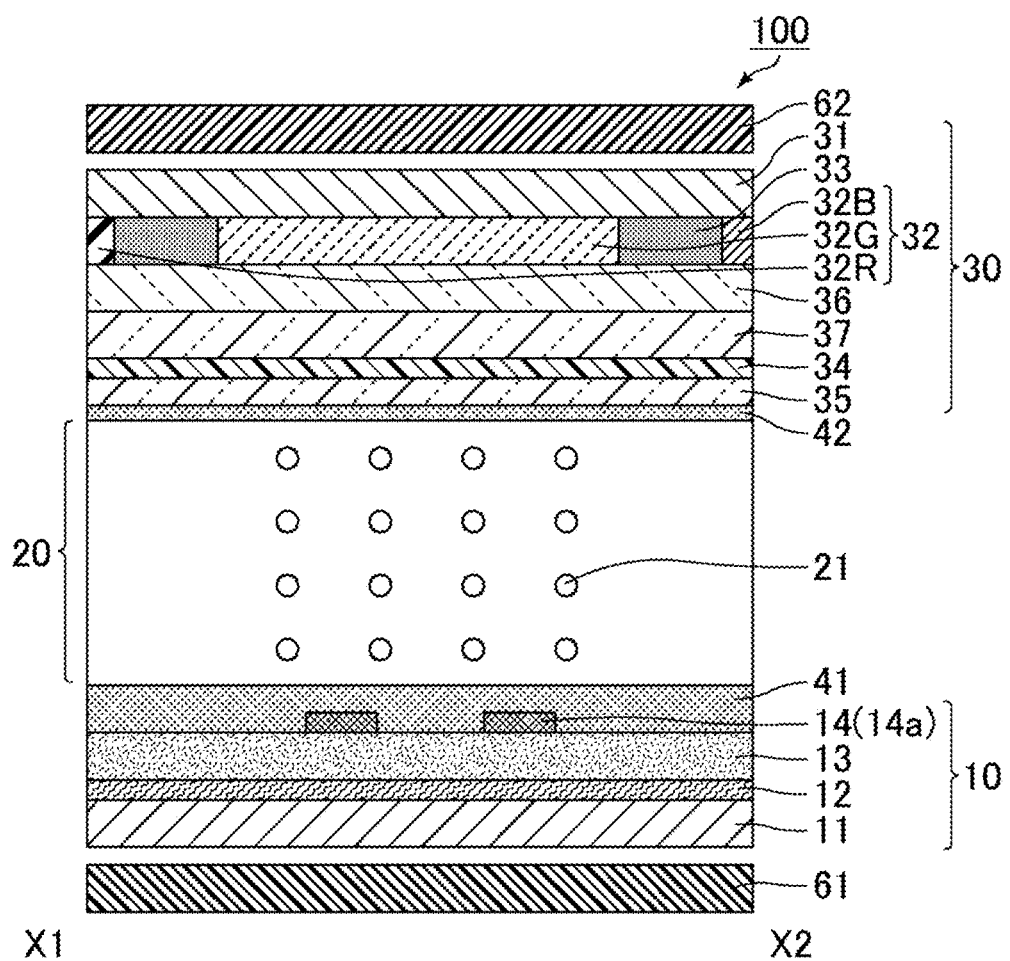
FIG. 2 is a schematic cross-sectional view taken along the line X1-X2 in FIG. 1.

The liquid crystal display device according to the embodiment is described below with reference to the drawings. FIG. 1 is a schematic plan view of an exemplary liquid crystal display device according to the embodiment. FIG. 2 is a schematic cross-sectional view taken along the line X1-X2 in FIG. 1. The "sub-pixel" as used herein refers to a region surrounded by two adjacent gate lines 1 and two adjacent source lines 2 on an active matrix substrate 10 as shown in FIG. 1 described later.

As shown in FIG. 1, a liquid crystal panel 100 includes sub-pixels arranged in a matrix pattern in the in-plane direction. The sub-pixels include the later-described first sub-pixel 70 and second sub-pixel 71 and are simply referred to as "sub-pixels" when no particular distinguishment is needed between the first sub-pixel 70 and the second sub-pixel 71. Each sub-pixel is provided with an optical opening that allows light to pass through the liquid crystal panel 100. In the case where the liquid crystal panel 100 is a transmissive one, the optical opening is a region that allows light emitted from the back surface of the liquid crystal panel 100 to travel toward the front surface of the liquid crystal panel 100. In the case where the liquid crystal panel 100 is a reflective one, the optical opening is a region that allows incident light, which enters from the outside of the liquid crystal panel 100, and reflected light, which is the incident light emitted toward the outside of the liquid crystal panel 100 after being reflected inside the liquid crystal panel 100, to pass through the liquid crystal panel 100. The optical opening may be superimposed with, for example, a transparent component such as a polarizer or a color filter in a plan view.

As shown in FIG. 2, the liquid crystal panel 100 sequentially includes the active matrix substrate 10, a first alignment film 41, a liquid crystal layer 20 containing liquid crystal molecules 21, a second alignment film 42, and a counter substrate 30. Herein, the side closer to the screen (display screen) of the liquid crystal display device is also referred to as the "viewer side (front surface side)", and the side farther from the display screen is also referred to as the "back surface side". The liquid crystal panel 100 may include on the back surface side (on the side remote from the liquid crystal layer 20 of the active matrix substrate 10) a first polarizer 61 and on the front surface side (on the side remote from the liquid crystal layer 20 of the counter substrate 30) a second polarizer 62. The first polarizer 61 and the second polarizer 62 are preferably linearly polarizers. An absorption axis 61A of the first polarizer 61 and an absorption axis 62A of the second polarizer 62 are preferably arranged in the crossed Nicols such that they are perpendicular to each other. Herein, in a plan view of the liquid crystal panel with the absorption axis 61A of the first polarizer 61 defined at the 0°-180° azimuths and the absorption axis 62A of the second polarizer 62 defined at the 90°-270° azimuths, the top-bottom directions mean the 90°-270° azimuths, the left-right directions mean the 0°-180° azimuths, the oblique direction means at least one of the 45° azimuth, the 135° azimuth, the 225° azimuth, or the 315° azimuth.

As shown in FIG. 1, the active matrix substrate 10 includes on the first substrate 11 parallel gate lines 1 and parallel source lines 2 intersecting the gate lines 1 via an insulating film. The gate lines 1 and the source lines 2 are arranged in a grid pattern as a whole. At each intersection of the gate lines 1 and the source lines 2 is disposed a thin film transistor (TFT) 3 as a switching element. Examples of the material for the gate lines 1 and the source lines 2 include metal materials such as aluminum, copper, titanium, molybdenum, chromium, and an alloy of any of these. Examples of the first substrate 11 and the later-described second substrate 31 include, but are not limited to, substrates made of a resin such as polycarbonate and glass substrates.

The active matrix substrate includes a first substrate, and a first electrode and a second electrode that are stacked via a first insulating layer or that face each other on the first substrate. Hereinafter, the embodiment describes the case of employing a fringe field switching (FFS) electrode structure in which the active matrix substrate 10 includes the first substrate 11, and a first electrode 12 and a second electrode 14 stacked via a first insulating layer 13 as shown in FIG. 2. Alternatively, an in-plane switching (IPS) electrode structure may be employed in which the active matrix substrate includes a first substrate, and a first electrode and a second electrode that face each other on the first substrate. Examples of the material for the first insulating layer 13 include inorganic materials such as silicon oxide and silicon nitride.

At least one of the first electrode 12 or the second electrode 14 is disposed for each first sub-pixel 70 and for each second sub-pixel 71. At least one of the first electrode 12 or the second electrode 14 may include linear electrode portions 14a. The embodiment describes the case where the second electrode 14 is disposed for each first sub-pixel 70 and for each second sub-pixel 71.

The first electrode 12 is preferably a solid electrode. The first electrode 12 may be disposed for each sub-pixel, may be disposed for each group of multiple sub-pixels, or may be disposed in the entire display region regardless of the boundaries of sub-pixels. The "solid electrode" as used herein means an electrode without slits or openings at least in a region superimposed with the optical openings of the sub-pixels in a plan view. Examples of the material for the first electrode 12 include transparent conductive materials such as indium tin oxide (ITO) and indium zinc oxide (IZO).

The second electrode 14 is disposed for each of the first sub-pixels 70 and for each of the second sub-pixels 71. The second electrodes 14 may each include the linear electrode portions 14a. Each second electrode 14 has a planar shape in which the linear electrode portions 14a are closed at both ends as shown in FIG. 1, for example. Each second electrode 14 may be provided with an opening 14b surrounded by electrode portions. The extending direction of the linear electrode portions 14a may form an angle of 0° to 5° with the absorption axis 61A of the first polarizer 61 or the absorption axis 62A of the second polarizer 62. As shown in FIG. 1, each linear electrode portion 14a may include at least a portion extending in the above extending direction and may include a portion extending in a different direction from the above extending direction. Examples of the material for the second electrode 14 include transparent conductive materials such as ITO and IZO. The electrode width $L_{14}$ of one linear electrode portion 14a may be 2 μm or greater and 5 μm or smaller, and the distance (width of the opening) $S_{14}$ between two adjacent linear electrode portions 14a may be 2 μm or greater and 5 μm or smaller.

For example, the second electrodes 14 disposed for the respective sub-pixels may be electrically connected to each other and may apply a common constant voltage to the sub-pixels, and the first electrodes 12 disposed for the respective sub-pixels may each be electrically connected to the corresponding source line 2 via the semiconductor layer of the corresponding TFT 3 and may apply different magnitudes of voltage to the sub-pixels in response to image signals. Alternatively, the second electrodes 14 disposed for the respective sub-pixels may each be electrically connected to the corresponding source line 2 via the semiconductor layer of the corresponding TFT 3 and may apply different magnitudes of voltage to the sub-pixels in response to image signals, and the first electrode 12 may be formed on the entire display region regardless of the boundaries of the sub-pixels, or multiple first electrodes 12 electrically connected to each other may be disposed for the respective sub-pixels and may apply a common constant voltage to the sub-pixels.

The liquid crystal layer 20 contains liquid crystal molecules 21. The liquid crystal molecules 21 preferably have a positive value for the anisotropy of dielectric constant (Δε) defined by the following formula (positive liquid crystals). The liquid crystal molecules 21 are preferably homogeneously aligned in a no-voltage-applied state (with no voltage applied). The direction of the major axes of the liquid crystal molecules 21 with no voltage applied is also referred to as the initial alignment of the liquid crystal molecules. The expression "with no voltage applied" includes a state with a voltage lower than the threshold value of the liquid crystal molecules applied.

Δε=(dielectric constant of liquid crystal molecules in major axis direction)−(dielectric constant of liquid crystal molecules in minor axis direction)

The expression "with no voltage applied" means the state in which a voltage equal to or higher than the threshold value of the liquid crystal molecules is not applied to the liquid crystal layer 20. Examples thereof include the state in which the same constant voltage is applied to all of the first electrode, the second electrodes, and the third electrode; the state in which a constant voltage is applied to at least one of the first electrode, the second electrodes, or the third electrode and a voltage lower than the threshold value of the liquid crystal molecules is applied to the other electrode(s), relative to the constant voltage.

The counter substrate 30 includes the second substrate 31 and a third electrode 34. Presence of the third electrode 34 can enhance the privacy using the veil-view function. Even when a certain alternating voltage is not applied (even when a constant voltage common to the first electrode 12 or the second electrodes 14 is applied) to the third electrode 34, a weak vertical electric field is formed in the thickness direction of the liquid crystal layer 20. Thus, the liquid crystal molecules 21 slightly rise as compared with the no-voltage-applied state. Providing grayscale display by applying a certain alternating voltage to the first electrode 12 or the second electrodes 14 while slightly raising the liquid crystal molecules 21 can cause a large difference in luminance between a sub-pixel (first sub-pixel 70) on the odd-number row side and a sub-pixel (second sub-pixel 71) on the even-number row side in observation from not only the oblique directions but also the left-right directions, which provides γ curves showing a sufficiently large contrast ratio of odd-number row-side sub-pixel/even-number row-side sub-pixel. Accordingly, a veil-view pattern is perceivable in observation of the display screen of the liquid crystal panel from not only the oblique directions but also the left-right directions. When a certain alternating voltage is applied to the third electrode 34, the tilt angle of the liquid crystal molecules 21 is increased to further enhance the privacy.

The third electrode 34 may be a transparent electrode. Examples of the material for the transparent electrode include transparent conductive materials such as ITO and IZO. The third electrode 34 is preferably a solid electrode. The third electrode 34 may be disposed for each sub-pixel, may be disposed for each group of multiple sub-pixels, or may be formed on the entire display region regardless of the boundaries of the sub-pixels. Preferably, multiple third electrodes 34 are electrically connected to each other in the entire display region and can apply a common constant voltage or a certain alternating voltage to the sub-pixels. FIG. 1 shows an example in which the third electrode 34 is formed in the entire display region regardless of the boundaries of sub-pixels.

As shown in FIG. 2, the counter substrate 30 may include color filters 32 and a black matrix 33 between the second substrate 31 and the third electrode 34. In a front view of the liquid crystal panel 100, the color filters 32 may be disposed for the respective sub-pixels so as to be superimposed with the optical openings as shown in FIG. 1. The color filters 32 include red color filters 32R, green color filters 32G, and blue color filters 32B, for example. The color filters 32 of the same color may be repeatedly arranged in the row or column direction of the liquid crystal panel 100, for example. Even in such a case, the boundaries of the sub-pixels are shielded from light by a black matrix 33, and thus the color filters 32 seem to be disposed for the respective sub-pixels and to be superimposed with the optical openings in a front view of the liquid crystal panel 100.

The black matrix 33 is not limited and may be a typical product used in the field of liquid crystal display devices. For example, a black matrix made of a black resin may be used. In a plan view, the black matrix 33 may be disposed around each optical opening or may be disposed to define each optical opening.

The counter substrate 30 may include a first dielectric layer 35 between the third electrode 34 and the second alignment film 42. The first dielectric layer 35 can weaken or prevent a vertical electric field that is unfortunately generated in the thickness direction of the liquid crystal layer 20 in the wide viewing angle mode in which no voltage is applied to the third electrode 34. As a result, the liquid crystal display device of the embodiment functions as a horizontal electric field mode liquid crystal display device, which forms a fringe electric field corresponding to that of an FFS mode liquid crystal display device not including electrodes on the usual counter substrate side, and thus can improve the mode efficiency as compared with the case without the first dielectric layer 35. The dielectric constant ε of the first dielectric layer 35 may be ε=3 to 4, for example. The first dielectric layer 35 has a thickness of preferably 0.5 μm or greater and 4 μm or smaller. With the first dielectric layer 35 having a thickness of greater than 4 μm, parallax confusion may be caused to possibly reduce the display quality. The first dielectric layer 35 may be made of a resin such as an acrylic resin or a polyimide resin.

The counter substrate 30 may include a second dielectric layer 36 between the color filters 32 and the third electrode 34. Presence of the second dielectric layer 36 can flatten the surfaces of the color filters 32 to reduce or prevent cracks in formation of the third electrode 34. Furthermore, a third dielectric layer 37 may be disposed between the third electrode 34 and the second dielectric layer 36. The second dielectric layer 36 and the third dielectric layer 37 may each have the same features including the dielectric constant ε, the thickness, and the material as the first dielectric layer 35.

The first alignment film 41 and the second alignment film 42 control the initial alignment azimuth of the liquid crystal molecules 21 with no voltage applied and the polar angle (pre-tilt angle) of the liquid crystal molecules 21 with no voltage applied. In terms of improving the viewing angle characteristics, the first alignment film 41 and the second alignment film 42 are each preferably an alignment film (horizontal alignment film) that aligns the liquid crystal molecules 21 parallel to a surface of the active matrix substrate 10 or a surface of the counter substrate 30 with no voltage applied to the liquid crystal layer 20. The expression "aligns parallel to" means that the tilt angle (including the pre-tilt angle) of the liquid crystal molecules 21 is 0° to 5°, preferably 0° to 3°, more preferably 0° to 1° with respect to a reference surface. The tilt angle (including the pre-tilt angle) of the liquid crystal molecules 21 means the angle of the major axes of the liquid crystal molecules 21 with respect to the reference surface.

Moreover, in order to make a veil-view pattern emphasized in observation of the liquid crystal panel from the up direction (90° azimuth) or the down direction (270° azimuth), the pre-tilt angle of the liquid crystal molecules 21 is preferably 3° or greater with respect to the surface of the active matrix substrate 10 and the surface of the counter substrate 30. Also, the difference between the inclination azimuth of the liquid crystal molecules 21 with respect to the surface of the active matrix substrate 10 and the inclination azimuth of the liquid crystal molecules 21 with respect to the surface of the counter substrate 30 is preferably 180°. For example, raising the liquid crystal molecules 21 from the 90° azimuth toward the 270° azimuth with respect to the surface of one of the active matrix substrate 10 and the counter substrate 30 and raising the liquid crystal molecules 21 from the 270° azimuth toward the 90° azimuth with respect to the other substrate can make the veil-view pattern more emphasized in observation from the up direction than from the down direction. The 180° difference between the inclination azimuth of the liquid crystal molecules 21 with respect to the surface of the active matrix substrate 10 and the inclination azimuth of the liquid crystal molecules 21 with respect to the surface of the counter substrate 30 can be achieved by performing alignment treatments in reverse alignment directions (180° different directions) to the first alignment film 41 on the surface of the active matrix substrate 10 and to the second alignment film 42 on the surface of the counter substrate 30 and then attaching the substrates.

The first alignment film 41 and the second alignment film 42 may each have been subjected to a rubbing alignment treatment or a photoalignment treatment. In the case of a photoalignment treatment, the first alignment film 41 and the second alignment film 42 are each preferably a photoalignment film. The photoalignment film contains a photo-functional group such as an azobenzene group, a chalcone group, a cinnamate group, a coumarin group, a tolan group, a stilbene group, or a cyclobutane ring. The photo-functional group is a functional group that causes a change in its structure, such as dimerization (formation of dimers), isomerization, photo Fries rearrangement, or decomposition (cleavage) upon irradiation with light such as ultraviolet light or visible light (electromagnetic waves, preferably polarized light, more preferably polarized ultraviolet light, particularly preferably linearly polarized ultraviolet light), to exert alignment controlling force to liquid crystal molecules.

The liquid crystal display device according to the embodiment may include a backlight on the back surface of the liquid crystal panel 100. Examples of the backlight include an edge-lit backlight and a direct-lit backlight.

Figure 3:
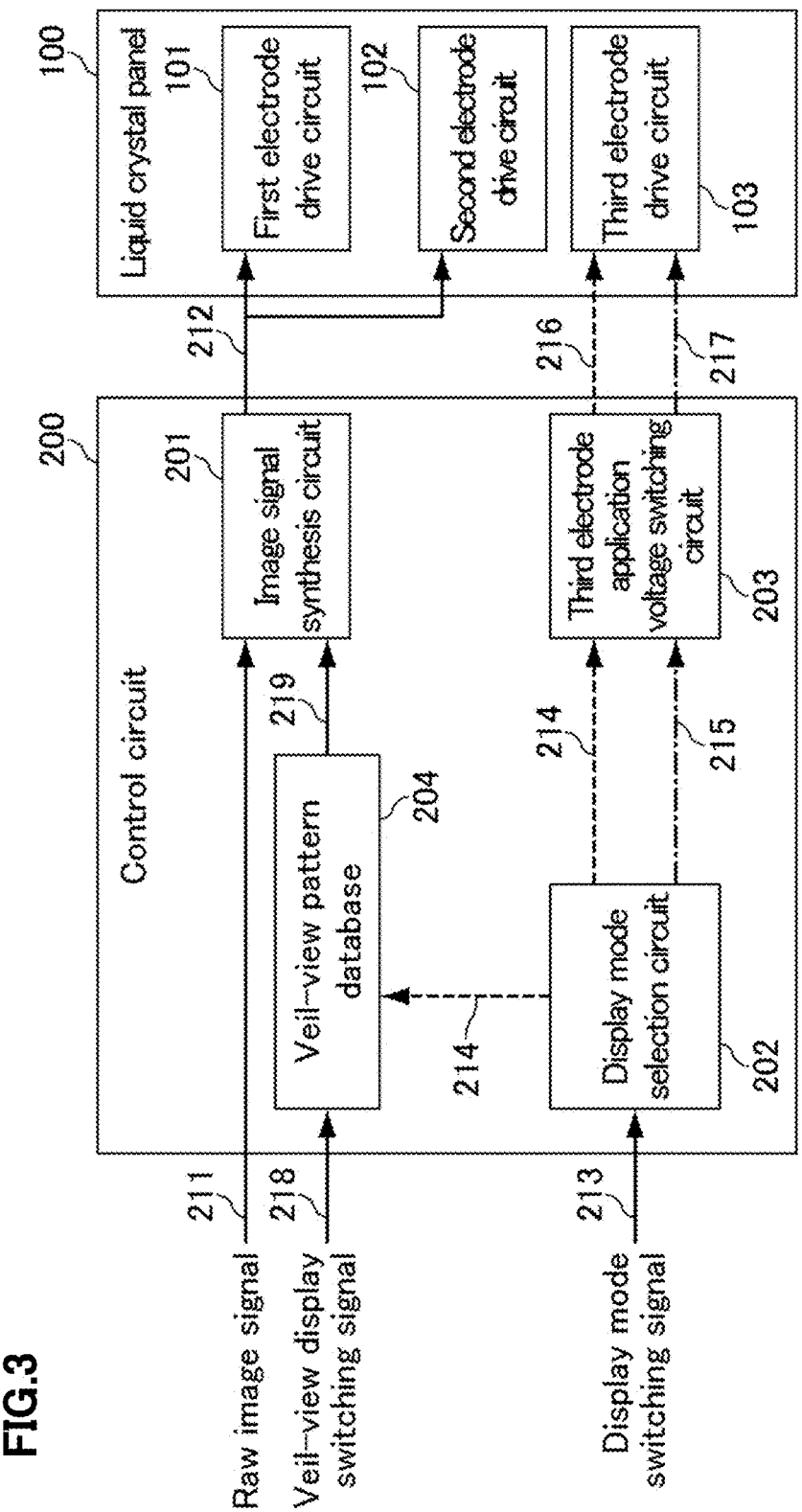
FIG. 3 is a block diagram schematically showing a display method of the liquid crystal display device according to the embodiment.

FIG. 3 is a block diagram schematically showing a display method of the liquid crystal display device according to the embodiment. As shown in FIG. 3, the liquid crystal display device according to the embodiment includes the liquid crystal panel 100 and a control circuit 200. The liquid crystal panel 100 may include a first electrode drive circuit 101 that applies voltage to the first electrode 12, a second electrode drive circuit 102 that applies voltage to the second electrodes 14, a third electrode drive circuit 103 that applies voltage to the third electrode 34. The control circuit 200 may include an image signal synthesis circuit 201, a database 204 in which information related to veil-view patterns is stored, a display mode selection circuit 202, and a third electrode application voltage switching circuit 203. FIG. 3 shows the case where the liquid crystal panel 100 includes the first electrode drive circuit 101, the second electrode drive circuit 102, and the third electrode drive circuit 103. Alternatively, the control circuit 200 may include these components.

As shown in FIG. 3, the image signal synthesis circuit 201, for example, receives a raw image signal 211 for displaying a desired image and outputs an image signal 212 corresponding to the received raw image signal 211 to the first electrode drive circuit 101 and the second electrode drive circuit 102.

Figure 4:
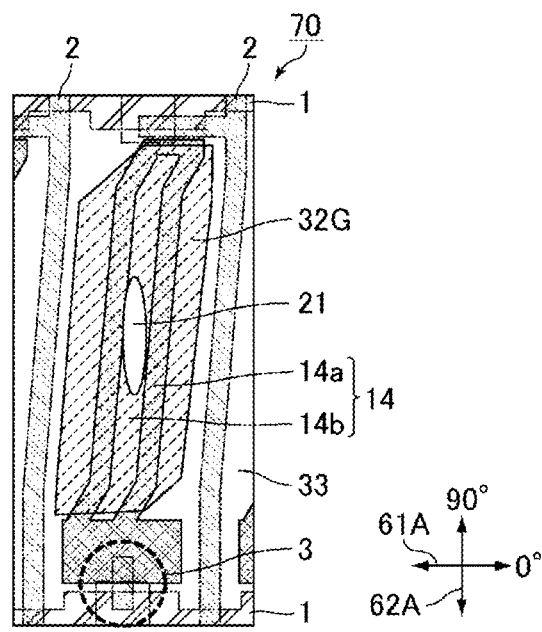
FIG. 4 is a schematic plan view of one sub-pixel in black display.
Figure 5:
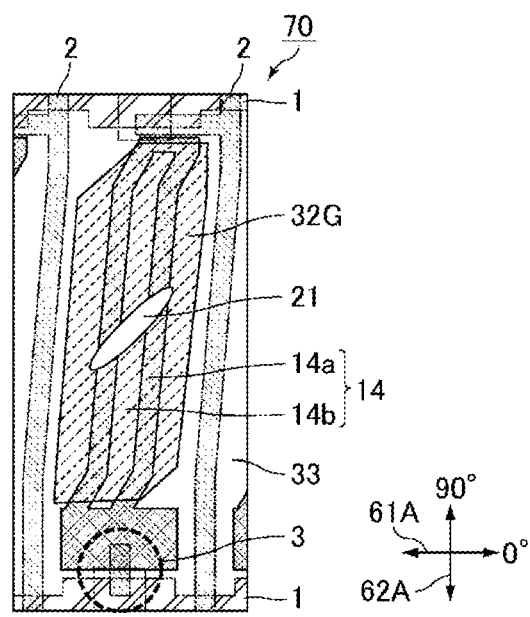
FIG. 5 is a schematic plan view of one sub-pixel in white display.

In the case of providing black display, the first electrode drive circuit 101 may apply a constant voltage (common voltage) to the first electrode 12, and the second electrode drive circuit 102 may apply a common voltage to the second electrodes 14. FIG. 4 is a schematic plan view of one sub-pixel in black display. FIG. 4 and the later-described FIG. 5 are each a schematic plan view of one sub-pixel of the liquid crystal display device shown in FIG. 1. Here, no electric field is generated in the liquid crystal layer, and thus the liquid crystal molecules 21 are aligned at the initial alignment azimuth as shown in FIG. 4. With the alignment azimuth of the liquid crystal molecules 21 set to be parallel to the absorption axis 61A of the first polarizer 61 or the absorption axis 62A of the second polarizer 62 in a plan view, black display is provided without light from the back surface of the liquid crystal panel passing through the liquid crystal layer. The black display means the display state with the lowest luminance (grayscale value of 0). FIG. 4 shows an example in which the alignment azimuth of the liquid crystal molecules 21 is parallel to the absorption axis 62A of the second polarizer 62.

In the case of providing white display, the second electrode drive circuit 102 may apply a common voltage to the second electrodes 14 and the first electrode drive circuit 101 may apply a certain alternating voltage to the first electrode 12; or the first electrode drive circuit 101 may apply a common voltage to the first electrode 12 and the second electrode drive circuit 102 may apply a certain alternating voltage to the second electrodes 14. FIG. 5 is a schematic plan view of one sub-pixel in white display. The fringe electric field formed between the first electrode 12 and the second electrodes 14 rotates the liquid crystal molecules 21 in the plane of the liquid crystal layer 20 and thereby changes the alignment azimuth of the liquid crystal molecules 21 from the initial alignment azimuth as shown in FIG. 5. Thereby, the direction of the major axes of the liquid crystal molecules 21 forms angles with the absorption axis 61A of the first polarizer and with the absorption axis 62A of the second polarizer, to allow light to pass through from the back surface of the liquid crystal panel. The white display means the display state with the highest luminance (grayscale value of 255).

Figure 6:
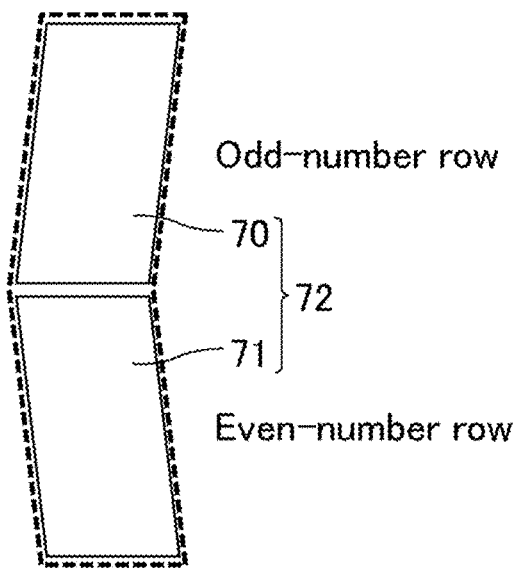
FIG. 6 is a schematic plan view of an exemplary display unit in a liquid crystal panel.

The liquid crystal panel 100 includes display units 72 for displaying an image using the veil-view function. FIG. 6 is a schematic plan view of an exemplary display unit in a liquid crystal panel. FIG. 6 schematically shows the first sub-pixel 70 and the second sub-pixel 71 shown in the drawings including FIG. 1. As shown in FIG. 6, the display units 72 each include, among the sub-pixels, a pair of sub-pixels arranged adjacent to each other, one of the sub-pixels being a first sub-pixel 70 selected from odd-number rows and the other being a second sub-pixel 71 selected from even-number rows. The first sub-pixel 70 and the second sub-pixel 71 are adjacent to each other in the column direction.

As shown in FIG. 1, the second electrode 14 superimposed with a first sub-pixel 70 and the second electrode 14 superimposed with the corresponding second sub-pixel 71 may include linear electrode portions 14a extending in different directions.

The control circuit 200 controls image signals input to the display units 72. The control circuit 200 may control image signals input to the first sub-pixel 70 and the second sub-pixel 71. An image can be displayed using the veil-view function by, for example, dividing the luminance data value of the raw image desired to be displayed as a first image, D1, into two equivalent data values D2 and D3, inputting the data value of D1+D2 to the first sub-pixel 70 or the second sub-pixel 71, and inputting the data value of D1−D3 to the other. When the liquid crystal panel is observed from the normal direction, for example, the luminance of the first sub-pixel 70 and the luminance of the second sub-pixel 71 are spatially averaged to be recognized as the luminance of the raw image. Meanwhile, when the panel is observed from a certain polar angle, the luminances are recognized as the luminance D1+D2 or the luminance D1−D3. Thereby, the raw image is perceived from the normal direction of the liquid crystal panel, while an image different from the raw image is perceivable in observation in a certain polar angle range.

The image different from the raw image and provided using the veil-view function is also referred to as a veil-view pattern. The veil-view pattern is a display image that is to be superimposed with the first image to make the first image less perceivable. The veil-view pattern may be perceived in any polar angle range and may be in a range of 45° or greater, for example, with the direction vertical to the surface of the liquid crystal panel defined as a polar angle of 0° and the direction parallel to the surface of the liquid crystal panel defined as a polar angle of 90°. The polar angle range in which the veil-view pattern is perceivable may be more preferably 30° or greater, still more preferably 20° or greater. The deepness of the veil-view pattern (easiness for perception) can be adjusted by adjusting the luminance levels of the first sub-pixel 70 and the second sub-pixel 71. Adjusting the deepness of the veil-view pattern can appropriately set the polar angle range in which the veil-view pattern is perceivable.

As shown in FIG. 3, when receiving a veil-view display switching signal 218, the database 204 outputs a veil-view pattern image signal 219 to the image signal synthesis circuit 201. The image signal synthesis circuit 201 outputs an image signal 212 formed by synthesis of the raw image signal 211 and the veil-view pattern image signal 219 to the first electrode drive circuit 101 and the second electrode drive circuit 102.

For example, when the second electrode drive circuit 102 applies a common voltage to the second electrodes 14, the first electrode drive circuit 101 applies different magnitudes of voltage to the first electrode(s) 12 corresponding to the first sub-pixel 70 and the second sub-pixel 71 such that the veil-view pattern is observed. In this case, one first electrode 12 is preferably provided in each sub-pixel. When the first electrode drive circuit 101 applies a common voltage to the first electrode 12, the second electrode drive circuit 102 applies different magnitudes of voltage to the second electrodes 14 corresponding to the first sub-pixel 70 and the second sub-pixel 71 such that the veil-view pattern is observed.

Figure 7:
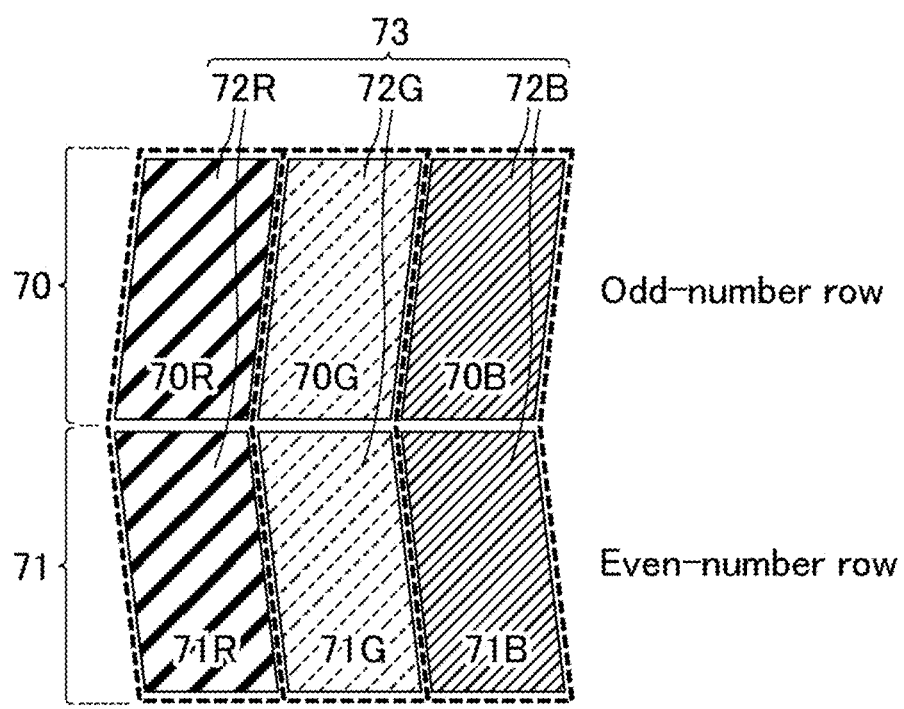
FIG. 7 is a schematic plan view of an exemplary color element for color display using the veil-view function.

The first sub-pixel 70 and the second sub-pixel 71 may each be considered as one sub-pixel as shown in FIG. 1, or a combination of a first red sub-pixel 70R, a first green sub-pixel 70G, and a first blue sub-pixel 70B may be regarded as the first pixel 70 and a combination of a second red sub-pixel 71R, a second green sub-pixel 71G, and a second blue sub-pixel 71B may be regarded as the second pixel 71 as shown in FIG. 7 described later. For color display by a normal display method for providing a raw image only, the pixels including red, green, and blue pixels are independently driven. In the normal color display for providing a raw image only, the display can be provided at a resolution twice that of the color display using the veil-view function. In order to achieve a wider viewing angle, the second display mode (wide viewing angle mode) may provide the raw image without performing display using the veil-view function.

FIG. 7 is a schematic plan view of an exemplary color element for color display using the veil-view function. As shown in FIG. 7, for color display, the liquid crystal panel 100 preferably includes a red display unit 72R including a first red sub-pixel 70R and a second red sub-pixel 71R, a green display unit 72G including a first green sub-pixel 70G and a second green sub-pixel 71G, and a blue display unit 72B including a first blue sub-pixel 70B and a second blue sub-pixel 71B. The first red sub-pixel 70R and the second red sub-pixel 71R are each superimposed with a red color filter 32R in an optical opening. The first green sub-pixel 70G and the second green sub-pixel 71G are each superimposed with a green color filter 32G in an optical opening. The first blue sub-pixel 70B and the second blue sub-pixel 71B are each superimposed with a blue color filter 32B in an optical opening.

Figure 8:
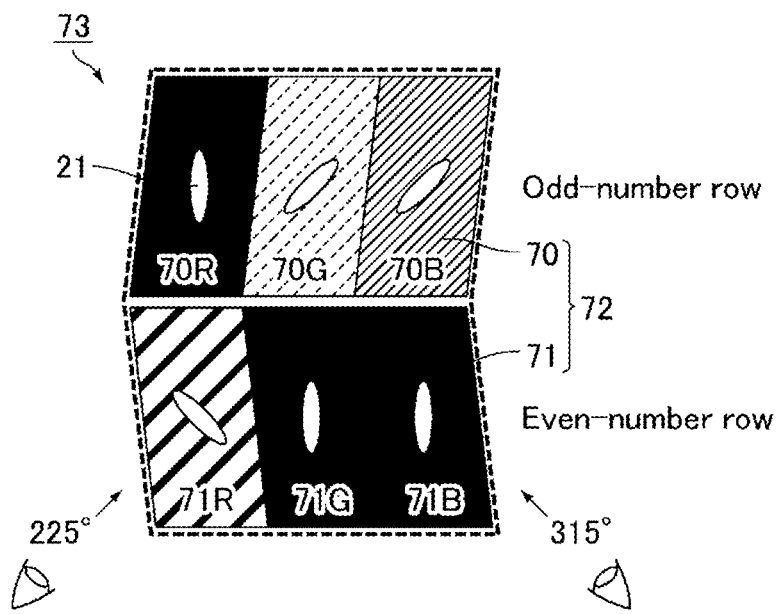
FIG. 8 is a schematic plan view of an exemplary display pattern for a color element.
Figure 9:
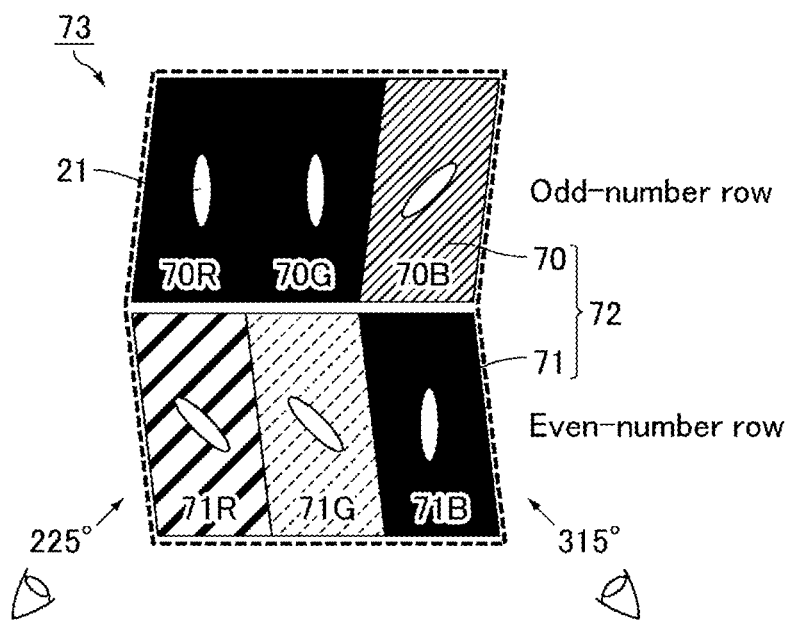
FIG. 9 is a schematic plan view of another exemplary display pattern for a color element.

FIG. 8 is a schematic plan view of an exemplary display pattern for a color element. FIG. 9 is a schematic plan view of another exemplary display pattern for a color element. A row in which the first sub-pixels 70 are arranged is also referred to as an odd-number row. A row in which the second sub-pixels 71 are arranged is also referred to as an even-number row. As shown in FIG. 8, when the first red sub-pixel 70R, the second green sub-pixel 71G, and the second blue sub-pixel 71B are in black display and the second red sub-pixel 71R, the first green sub-pixel 70G, and the first blue sub-pixel 70B are in white display, the liquid crystal molecules present in the second red sub-pixel 71R in observation at an azimuth of 225° are observed from the direction of the minor axes of the liquid crystal molecules in which the retardation is high, and thus a red color is observed. In contrast, the liquid crystal molecules in the first green sub-pixel 70G and the first blue sub-pixel 70B are observed from the direction of the major axes of the liquid crystal molecules in which the retardation is low, so that the corresponding colors are not observed. As a result, the red color is perceived. Meanwhile, in observation at an azimuth of 315°, the liquid crystal molecules in the first green sub-pixel 70G and the first blue sub-pixel 70B are observed from the direction of the minor axes of the liquid crystal molecules, so that a cyan color, which is a mixture of blue and green colors, is perceived. Here, the liquid crystal molecules in the second red sub-pixel 71R are observed from the direction of the major axes of the liquid crystal molecules, so that the corresponding color is not observed. As a result, the cyan color is perceived. As shown in FIG. 9, when the first red sub-pixel 70R, the first green sub-pixel 70G, and the second blue sub-pixel 71B are in black display and the second red sub-pixel 71R, the second green sub-pixel 71G, and the first blue sub-pixel 70B are in white display, observation at an azimuth of 225° results in perception of a yellow color, which is a mixture of red and green colors, and observation at an azimuth of 315° results in perception of a blue color.

Figure 10:
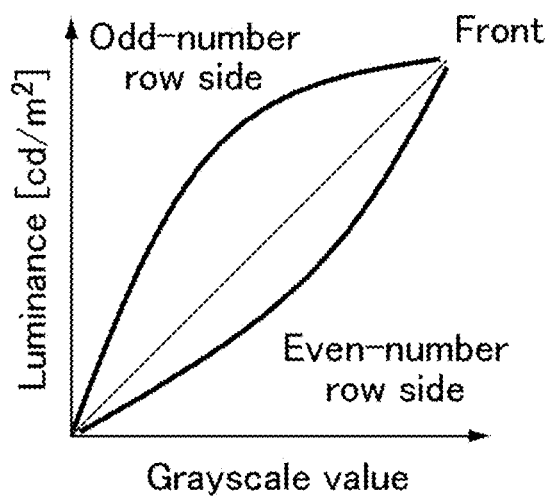
FIG. 10 shows an example of γ curves of a liquid crystal panel.

When the display pattern of the color elements shown in FIG. 8 and the display pattern of the color elements shown in FIG. 9 are combined, observation from the direction normal to the liquid crystal panel (from the front) results in observation of white display. FIG. 10 shows an example of γ curves of a liquid crystal panel. As shown in FIG. 10, in the range of intermediate values, the difference in contrast ratio between an image formed by sub-pixels on the odd-number row side and an image formed by sub-pixels on the even-number row side is large in observation from a certain direction. A veil-view pattern is preferably formed in such an intermediate value range in which a sufficient difference in perception (contrast ratio) between the sub-pixels on the odd-number row side and the sub-pixels on the even-number row side can be achieved.

The veil-view pattern is not limited, and may be a geometric pattern such as a striped pattern or a checkered pattern, characters, or an image.

Figure 11:
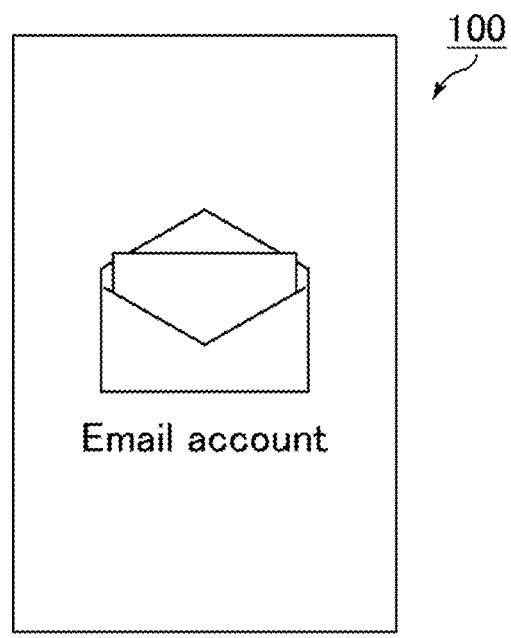
FIG. 11 is a schematic view of a display screen of a liquid crystal panel observed from the normal direction.
Figure 12:
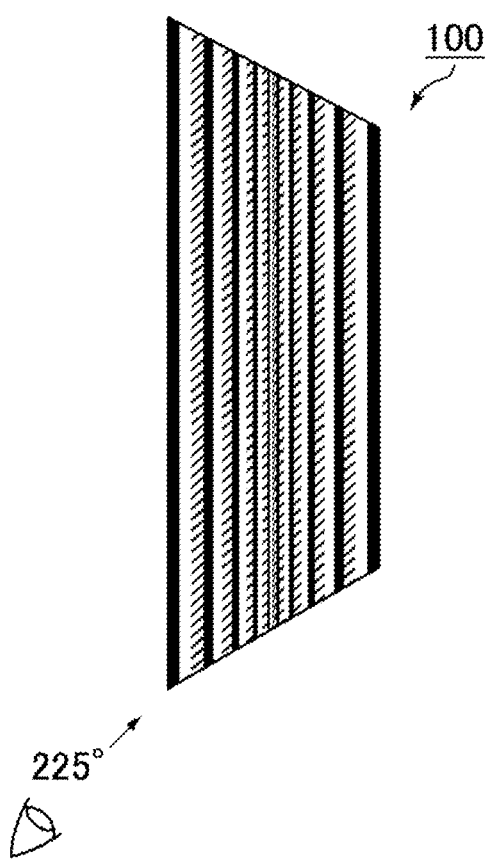
FIG. 12 is a schematic view of the display screen of the liquid crystal panel observed at an azimuth of 225°.
Figure 13:
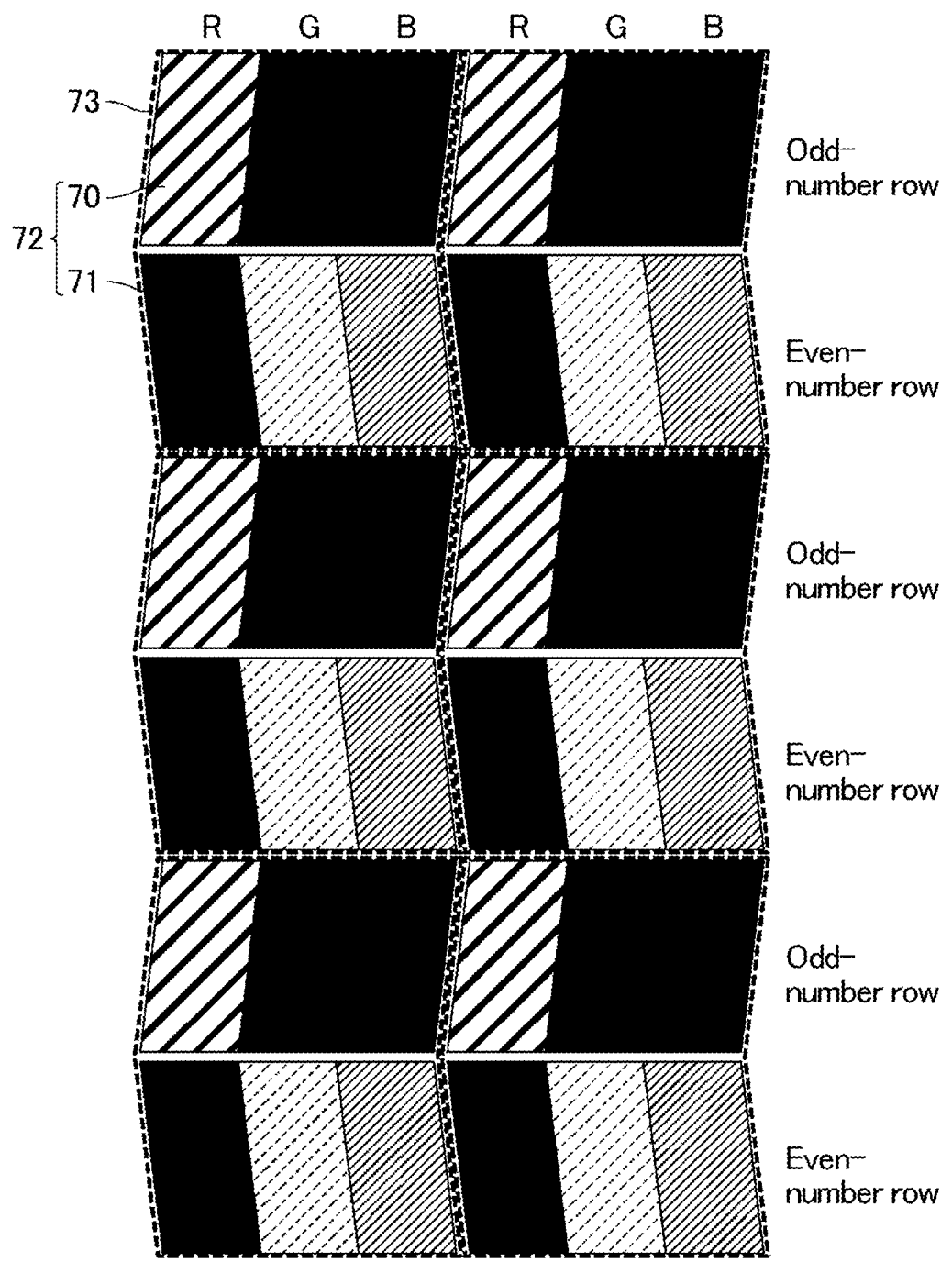
FIG. 13 is a schematic plan view of the liquid crystal panel, showing arrangement of color elements in a portion for displaying cyan stripes shown in FIG. 12.
Figure 14:
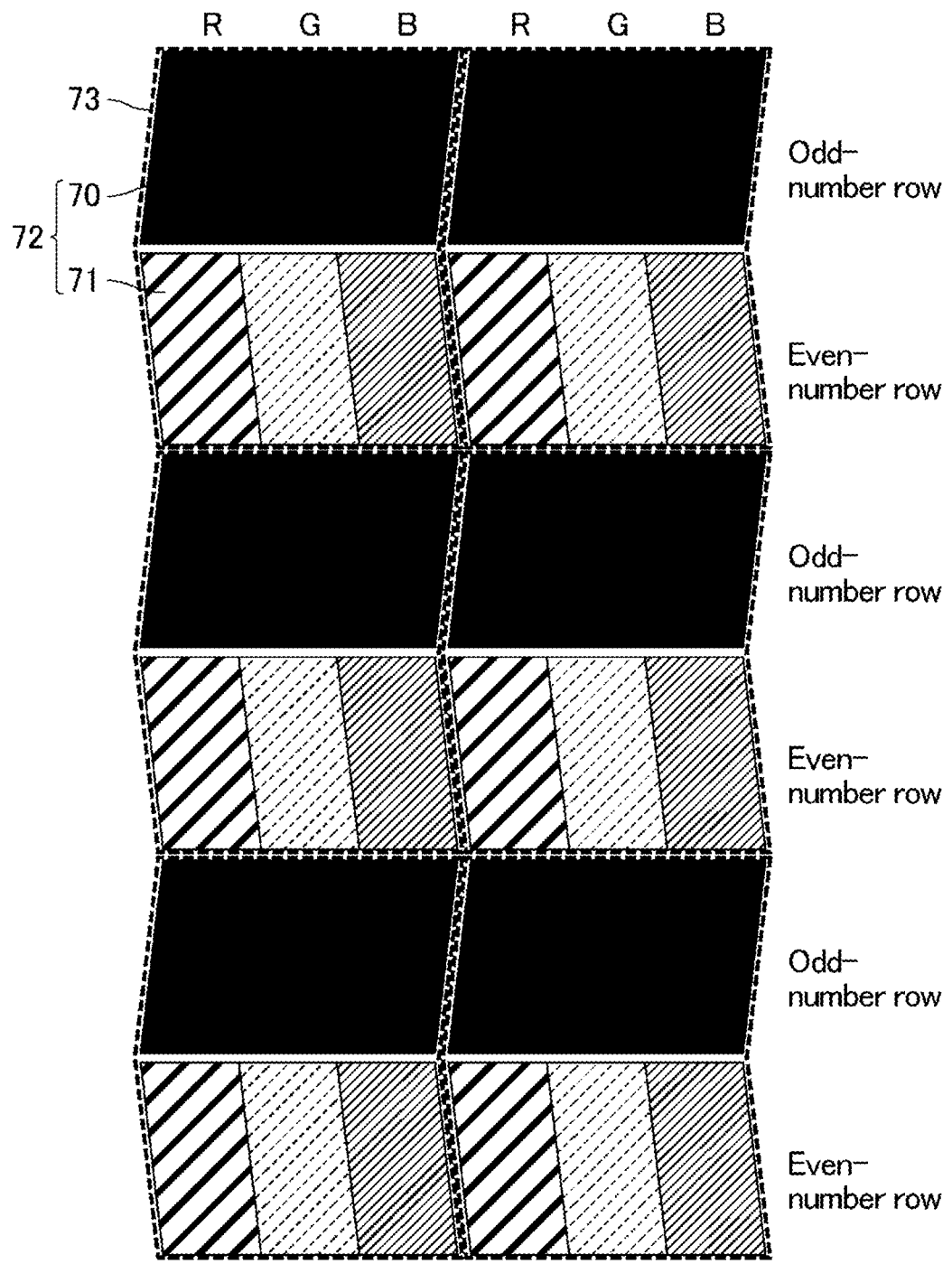
FIG. 14 is a schematic plan view of the liquid crystal panel, showing arrangement of color elements in a portion for displaying white stripes shown in FIG. 12.
Figure 15:
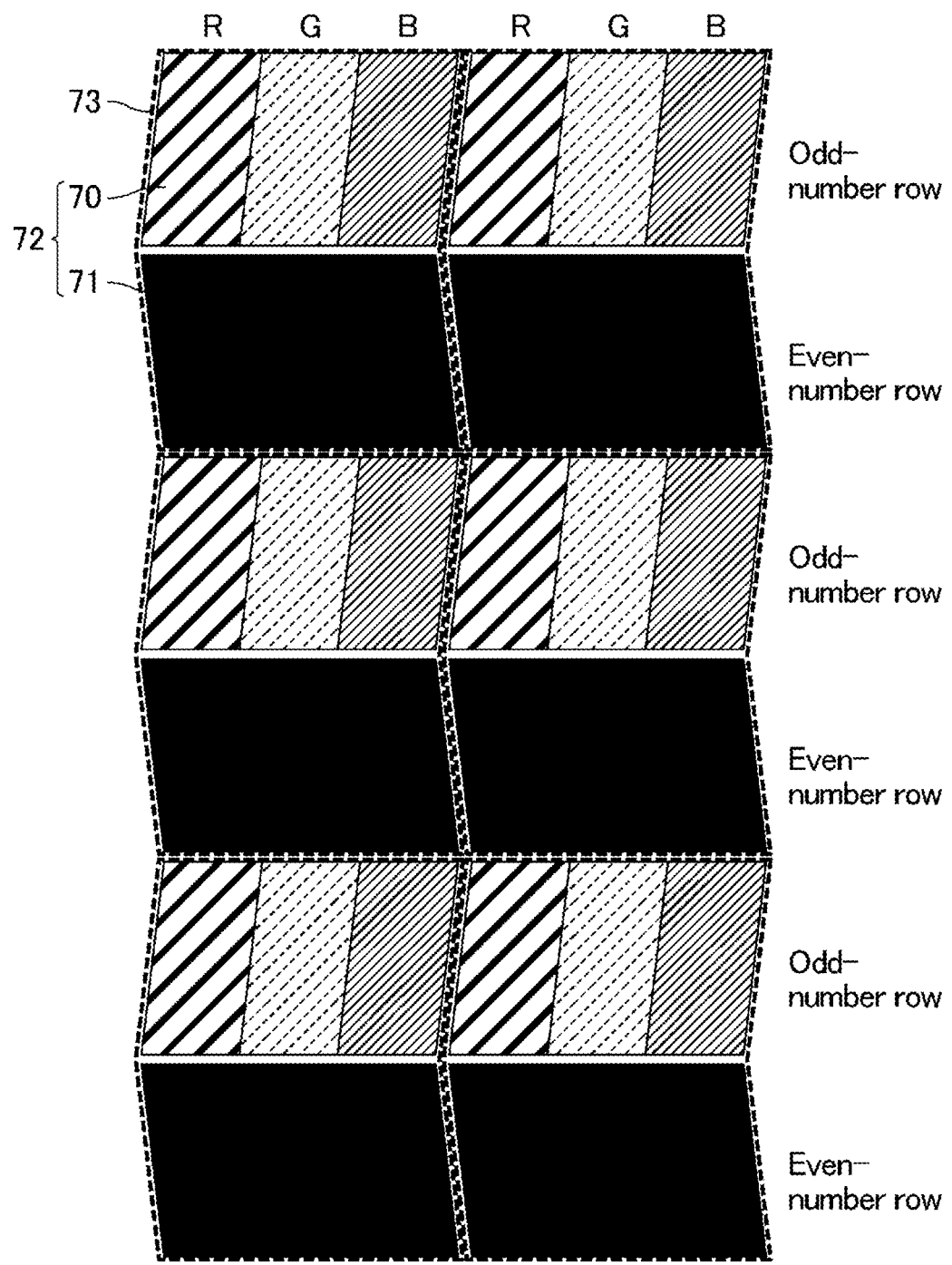
FIG. 15 is a schematic plan view of the liquid crystal panel showing arrangement of color elements in a portion for displaying black stripes shown in FIG. 12.

A specific example of the veil-view pattern is described below with reference to FIG. 11 to FIG. 15. FIG. 13 to FIG. 15 schematically show the first sub-pixel 70 and the second sub-pixel 71 shown in the drawings including FIG. 1. FIG. 11 is a schematic view of a display screen of a liquid crystal panel observed from the normal direction. FIG. 12 is a schematic view of the display screen of the liquid crystal panel observed at an azimuth of 225°. When the display screen of the liquid crystal panel is observed from the normal direction, an envelope image and the characters "Email account" are perceived as the first image as shown in FIG. 11. When the display screen of the liquid crystal panel is observed at an azimuth of 225°, a striped pattern as shown in FIG. 12 is perceived as the veil-view pattern on the first image. This makes the first image less perceivable from oblique directions, enhancing the privacy.

As shown in FIG. 12, the striped pattern is perceived as, for example, stripes of cyan, white, and black in observation at an azimuth of 225° and stripes of red, black, and white in observation at an azimuth of 315°.

FIG. 13 is a schematic plan view of a liquid crystal panel showing arrangement of color elements in a portion for displaying cyan stripes shown in FIG. 12. As shown in FIG. 13, color elements 73 are arranged in the row and column directions of the liquid crystal panel, with the first red sub-pixels 70R, the second green sub-pixels 71G, and the second blue sub-pixels 71B providing normal display and the second red sub-pixels 71R, the first green sub-pixels 70G, and the first blue sub-pixels 70B providing black display. With this arrangement, the liquid crystal display device can display cyan stripes in observation at an azimuth of 225° and red stripes in observation at an azimuth of 315° as veil-view patterns. The normal display is display for the first image.

FIG. 14 is a schematic plan view of a liquid crystal panel showing arrangement of color elements in a portion for displaying white stripes shown in FIG. 12. For white stripes, as shown in FIG. 14, the color elements 73 are arranged in the row and column directions of the liquid crystal panel, with the first red sub-pixels 70R, the first green sub-pixels 70G, and the first blue sub-pixels 70B providing black display and the second red sub-pixels 71R, the second green sub-pixels 71G, and the second blue sub-pixels 71B providing normal display. With this arrangement, the liquid crystal display device can display white stripes in observation at an azimuth of 225° and black stripes in observation at an azimuth of 315°.

FIG. 15 is a schematic plan view of the liquid crystal panel showing arrangement of color elements in a portion for displaying black stripes shown in FIG. 12. For black stripes, as shown in FIG. 15, the color elements 73 are arranged in the row and column directions of the liquid crystal panel, with the first red sub-pixels 70R, the first green sub-pixels 70G, and the first blue sub-pixels 70B providing normal display and the second red sub-pixels 71R, the second green sub-pixels 71G, and the second blue sub-pixels 71B providing black display. With this arrangement, the liquid crystal display device can display black stripes in observation at an azimuth of 225° and white stripes in observation at an azimuth of 315°.

The control circuit 200 may switch between the first display mode (also referred to as the narrow viewing angle mode) which allows a first image to be observable in a narrow viewing angle range including the normal direction of the liquid crystal panel 100 and the second display mode (also referred to as the wide viewing angle mode) which allows the first image to be observable in a wide viewing angle range including the narrow viewing angle range.

In the narrow viewing angle range, the contrast ratio is preferably lower than 2 when the liquid crystal panel is observed at a certain polar angle or greater from an oblique direction (an azimuth angle of 45°, 135°, 225°, or) 315°. The polar angle is herein expressed according to the definition in which the direction vertical to the surface of the liquid crystal panel is defined as a polar angle of 0° and the direction parallel to the surface of the panel as a polar angle of 90°. The polar angle that allows the contrast ratio to be lower than 2 is preferably 60° or greater, more preferably 45° or greater, still more preferably 30° or greater, for example. In other words, the narrow viewing angle mode is preferably a mode that allows the contrast ratio to be lower than 2 at at least one azimuth selected from the azimuth angles 0°, 45°, 90°, 135°, 180°, 225°, 270°, and 315° in a polar angle range excepting a polar angle of 0° (from the front), i.e., a polar angle range of 60° or greater, more preferably 45° or greater, still more preferably 30° or greater. In the narrow viewing angle mode, the contrast ratio at a polar angle of 0° (from the front) is preferably 10 or greater, more preferably 20 or greater. The wide viewing angle range means the range having a polar angle greater than that in the narrow viewing angle range. The wide viewing angle mode is preferably a mode that allows the contrast ratio to be 2 or greater, more preferably 10 or greater at at least two azimuths selected from the azimuth angles 0°, 45°, 90°, 135°, 180°, 225°, 270°, and 315° in a polar angle range of 60° or greater and smaller than 90°. The polar angle range in which the veil-view pattern is perceivable may be the same as or different from the wide viewing angle range.

The following describes a method for switching display modes. The display mode selection circuit 202 receives a display mode switching signal 213 for switching between the first display mode and the second display mode. When the first display mode is selected, the display mode selection circuit 202 outputs a first display mode selection signal 214 to the third electrode application voltage switching circuit 203. When the second display mode is selected, the display mode selection circuit 202 outputs a second display mode selection signal 215 to the third electrode application voltage switching circuit 203.

The control circuit 200 switches between application of alternating voltage and application of constant voltage to the third electrode 34. Controlling the voltage applied to the third electrode 34 can switch between the narrow viewing angle mode and the wide viewing angle mode. For example, the third electrode application voltage switching circuit 203 inputs an alternating signal 216 or a constant voltage signal 217 to the third electrode drive circuit 103 according to the received display mode selection signal so as to switch between application of alternating voltage and application of constant voltage to the third electrode 34.

The control circuit 200 may apply an alternating voltage to the third electrode 34 in the first display mode and may apply to the third electrode 34 a constant voltage common to the first electrode or the second electrode in the second display mode. For example, when receiving the first display mode selection signal 214 from the display mode selection circuit 202, the third electrode application voltage switching circuit 203 outputs the alternating signal 216 to the third electrode drive circuit 103, whereby a certain alternating voltage is applied to the third electrode 34. When receiving the second display mode selection signal 215 from the display mode selection circuit 202, the third electrode application voltage switching circuit 203 outputs the constant voltage signal 217 to the third electrode drive circuit 103, whereby a constant voltage common to the first electrode 12 or the second electrode 14 is applied to the third electrode 34.

The constant voltage is a reference voltage for driving the liquid crystal display device. For example, a certain voltage may be applied to the first electrode 12 or the second electrode 14, or the first electrode 12 or the second electrode 14 may be grounded. In the case where the constant voltage is applied to the third electrode 34, the third electrode may be electrically connected to the first electrode 12 or the second electrode 14; the constant voltage common to the first electrode 12 or the second electrode 14 may be applied to the third electrode through a signal line different from the first electrode 12 or the second electrode 14; or the third electrode 34 may be grounded.

Figure 16:
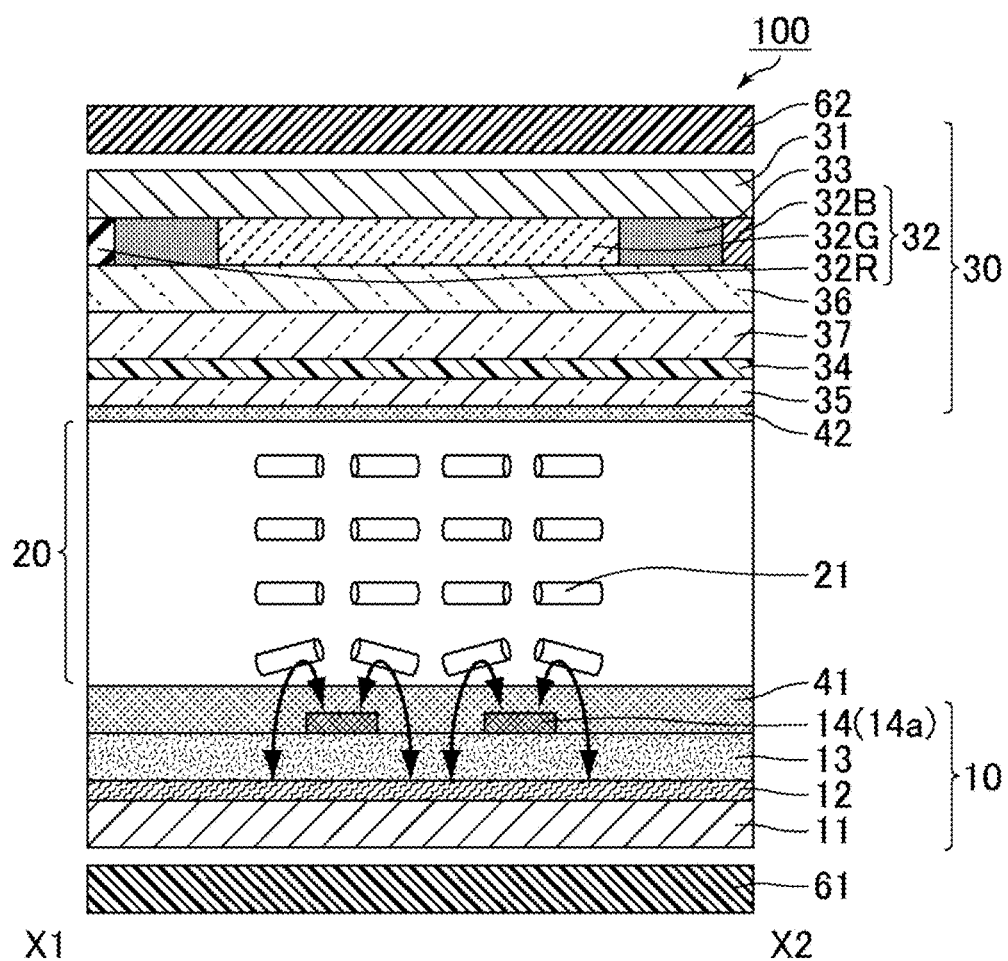
FIG. 16 is a schematic cross-sectional view of one sub-pixel in white display in the wide viewing angle mode.
Figure 17:
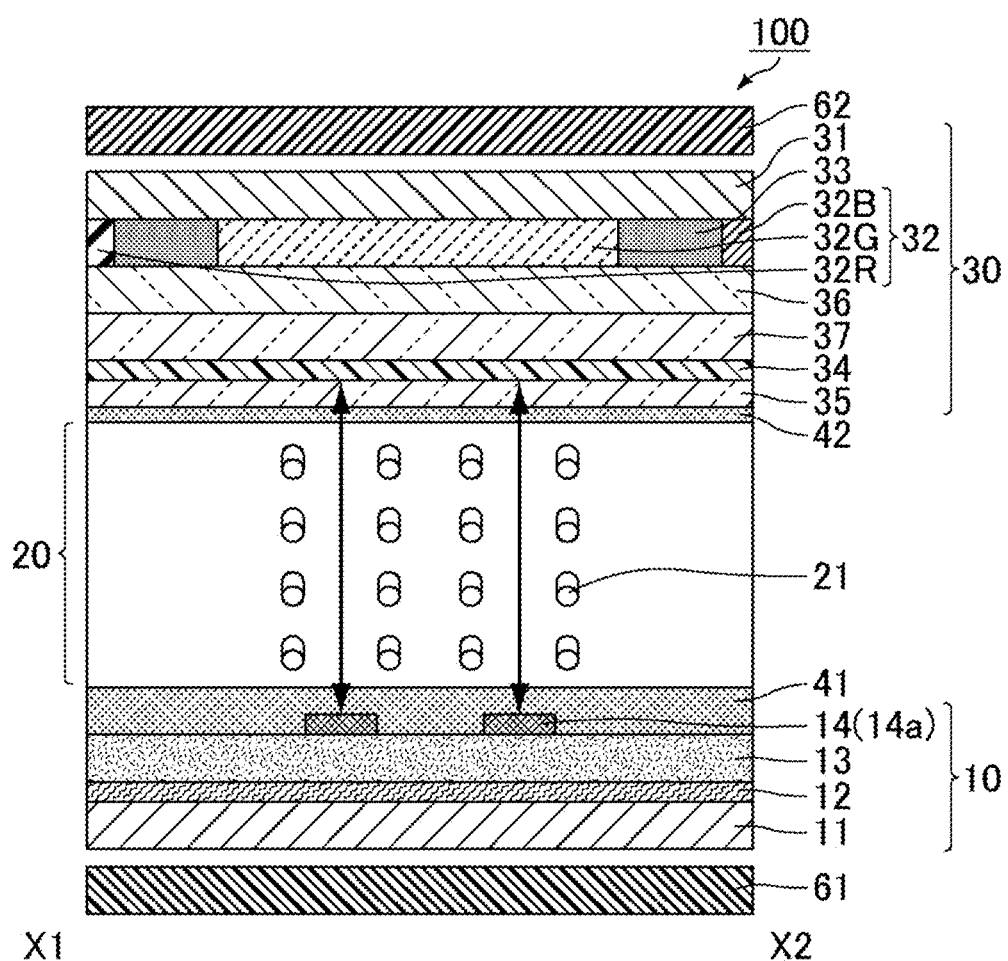
FIG. 17 is a schematic cross-sectional view of one sub-pixel in black display in the narrow viewing angle mode.
Figure 18:
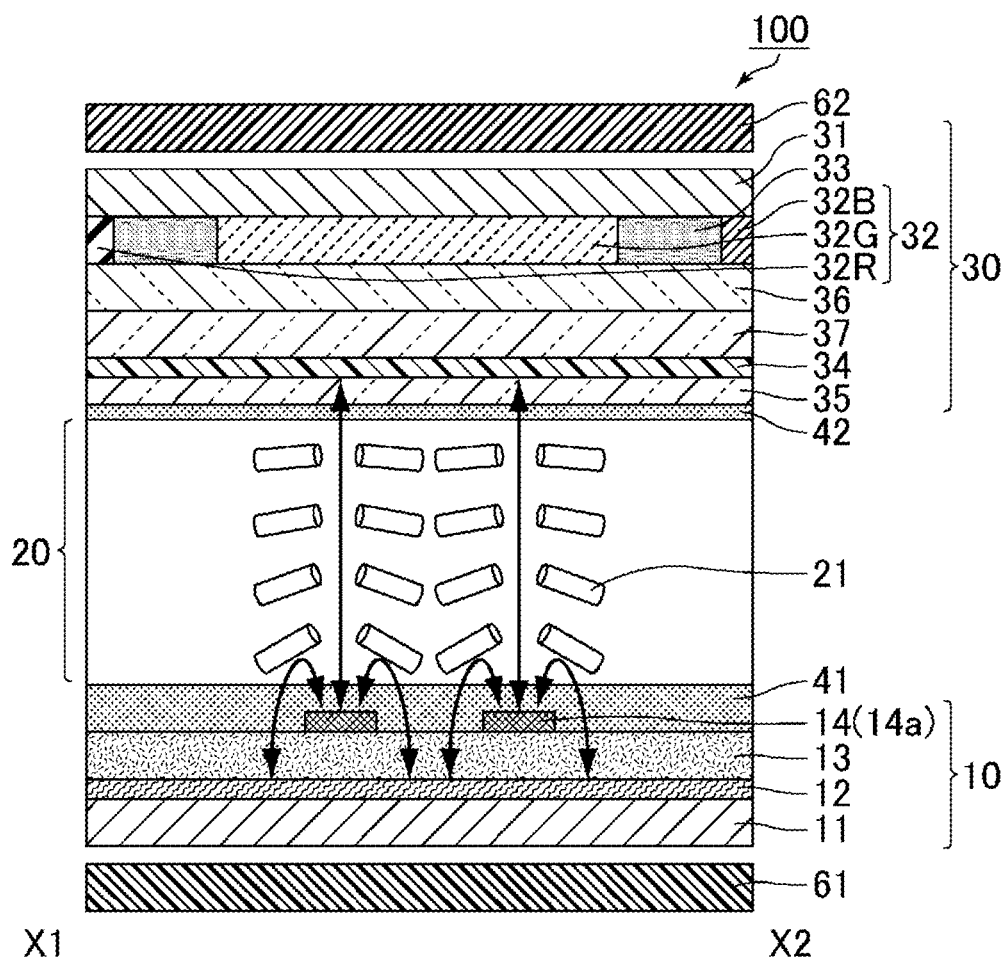
FIG. 18 is a schematic cross-sectional view of one sub-pixel in white display in the narrow viewing angle mode.

Hereinafter, display methods for the narrow viewing angle mode and the wide viewing angle mode are described with reference to FIG. 2, FIG. 4, FIG. 5, and FIG. 16 to FIG. 18. FIG. 2 is also a schematic cross-sectional view of one sub-pixel in black display in the wide viewing angle mode. FIG. 4 is also a schematic plan view of one sub-pixel in black display in the wide viewing angle mode. FIG. 5 is a schematic plan view of one sub-pixel in white display in the wide viewing angle mode. FIG. 16 is a schematic cross-sectional view of one sub-pixel in white display in the wide viewing angle mode. FIG. 17 is a schematic cross-sectional view of one sub-pixel in black display in the narrow viewing angle mode. FIG. 18 is a schematic cross-sectional view of one sub-pixel in white display in the narrow viewing angle mode.

In the case of providing black display in the wide viewing angle mode, for example, a common voltage is applied to the second electrodes 14 and the first electrode 12 and the constant voltage common to the first electrode 12 and the second electrode 14 is applied to the third electrode 34. Here, no electric field is generated in the liquid crystal layer 20, and thus the liquid crystal molecules 21 are aligned at the initial alignment azimuth. With no voltage applied to the liquid crystal layer 20, the liquid crystal molecules 21 are preferably aligned parallel to the surface of the active matrix substrate 10 and the surface of the counter substrate 30. With the alignment azimuth of the liquid crystal molecules 21 set to be parallel to the absorption axis 61A of the first polarizer 61 or the absorption axis 62A of the second polarizer 62 in a plan view, black display is provided without light from the back surface of the liquid crystal panel passing through the liquid crystal layer 20. FIG. 4 shows an example in which the alignment azimuth of the liquid crystal molecules 21 is parallel to the absorption axis 62A of the second polarizer 62.

In the case of providing grayscale display in the wide viewing angle mode, for example, the control circuit 200 applies a common voltage to one of the first electrode 12 and the second electrodes 14 and applies a voltage different from the common voltage to the other while applying to the third electrode 34 the constant voltage common to the first electrode 12 or the second electrodes 14. For example, when a common voltage is applied to the second electrodes 14, the alternating voltage applied to the first electrode 12 is adjusted from 0 V to 4 V relative to the common voltage while applying the constant voltage (0 V) common to the common voltage to the third electrode 34, whereby grayscale display from black display to white display can be provided. As shown in FIG. 16, a fringe electric field is formed between the first electrode 12 and the second electrodes 14. The fringe electric field formed between the first electrode 12 and the second electrodes 14 rotates the liquid crystal molecules 21 in the plane of the liquid crystal layer 20 as shown in FIG. 5. Thereby, the direction of the major axes of the liquid crystal molecules 21 forms angles with the absorption axis 61A of the first polarizer and with the absorption axis 62A of the second polarizer, to allow light to pass through from the back surface of the liquid crystal panel.

With the counter substrate 30 including the third electrode 34, even when a common voltage is applied to the third electrode 34, a weak vertical electric field is formed between the third electrode 34 and the first electrode 12. The weak vertical electric field formed in the thickness direction of the liquid crystal layer 20 causes the liquid crystal molecules 21 to have a slightly greater tilt angle than in the no-voltage-applied state with respect to the active matrix substrate 10 and the counter substrate 30. Providing grayscale display while slightly raising the liquid crystal molecules 21 can make the veil-view pattern perceivable in observation of the display screen of the liquid crystal panel from not only the oblique directions but also the left-right directions.

In the case of providing black display in the narrow viewing angle mode, for example, the control circuit 200 applies a common voltage to the second electrodes 14 and the first electrode 12 while applying an alternating voltage the third electrode 34. As shown in FIG. 17, an electric field is formed between the third electrode 34 and a group including the first electrode 12 and the second electrodes 14. Thus, the tilt angle of the liquid crystal molecules 21 with respect to the active matrix substrate 10 and the counter substrate 30 is greater than the pre-tilt angle with no voltage applied. The alignment azimuth in a plan view of the liquid crystal molecules in black display in the narrow viewing angle mode is similar to that shown in FIG. 4 and thus is not described.

In the case of providing grayscale display in the narrow viewing angle mode, for example, the control circuit 200 applies a common voltage to one of the first electrode 12 and the second electrodes 14 and applies a voltage different from the common voltage to the other while applying an alternating voltage to the third electrode 34. For example, a common voltage is applied to the second electrodes 14 and the alternating voltage applied to the first electrode is adjusted from 0 V to 4 V relative to the common voltage while applying to the third electrode 34 an alternating voltage of 2.5 V relative to the common voltage, whereby grayscale display from black display to white display can be provided. Here, a fringe electric field is formed between the first electrode 12 and the second electrodes 14, and a vertical electric field in the thickness direction of the liquid crystal layer 20 is formed between the third electrode 34 and a group including the first electrode 12 and the second electrodes 14. Then, an electric field formed by synthesis of the fringe electric field and the vertical electric field is formed in the liquid crystal layer 20. Thus, the liquid crystal molecules 21, under the influence of the electric field formed between the third electrode 34 and the group including the first electrode 12 and the second electrodes 14, change the alignment azimuth while forming an angle with the active matrix substrate 10. Thereby, light from the back surface of the liquid crystal panel is passed through the liquid crystal layer. Here, the liquid crystal molecules 21 form a greater angle with the active matrix substrate 10 than in the case of providing grayscale display in the wide viewing angle mode. Accordingly, the first image is observable in the narrow viewing angle range, while the first image can be less observable in the wide viewing angle range due to a change caused to the image, such as an extremely reduced contrast ratio. The alignment azimuth of the liquid crystal molecules in a plan view when providing white display in the narrow viewing angle mode is similar to that shown in FIG. 5 and thus is not described.

Display using the veil-view function can enhance the privacy when combined with the first display mode (narrow viewing angle mode). Thus, when receiving the first display mode selection signal 214 from the display mode selection circuit 202, the database 204 may output the veil-view pattern image signal 219 to the image signal synthesis circuit 201.

The control circuit in the first display mode may input different image signals to the first sub-pixel and the second sub-pixel such that a second image different from the first image is observed in the wide viewing angle range. The second image is preferably the veil-view pattern. For example, when the second electrode drive circuit 102 applies a common voltage to the second electrodes 14, the first electrode drive circuit 101 applies different magnitudes of voltage to the first electrode(s) 12 corresponding to the first sub-pixel 70 and the second sub-pixel 71 such that the second image is observed in the wide viewing angle range. When the first electrode drive circuit 101 applies a common voltage to the first electrode 12, the second electrode drive circuit 102 applies different magnitudes of voltage to the second electrodes 14 corresponding to the first sub-pixel 70 and the second sub-pixel 71 such that the second image is observed in the wide viewing angle range.

Hereinafter, the effects of the present invention are described based on examples and a comparative example. The examples, however, are not intended to limit the scope of the present invention.

Example 1

A liquid crystal display device according to Example 1 includes the liquid crystal panel 100 and the control circuit 200. The liquid crystal panel 100 has the structure shown in FIG. 1 and FIG. 2. The control circuit 200 operates the control shown in FIG. 3. The liquid crystal panel 100 sequentially includes the first polarizer 61, the active matrix substrate 10, the first alignment film 41, the liquid crystal layer 20, the second alignment film 42, the counter substrate 30, and the second polarizer 62. The absorption axis 61A of the first polarizer 61 and the absorption axis 62A of the second polarizer 62 were made perpendicular to each other.

The active matrix substrate 10 sequentially includes the first substrate 11, a 100-nm-thick ITO solid electrode as the first electrode 12, a 110-μm-thick silicon nitride film as the first insulating layer 13, and an ITO electrode disposed for each sub-pixel as each second electrode 14. The second electrodes 14 each included the linear electrode portions 14a, and the ratio of width $L_{14}$ of one linear electrode portion 14a/distance $S_{14}$ between two adjacent linear electrode portions 14a was 2.5 μm/3 μm.

The liquid crystal layer 20 contains the liquid crystal molecules 21 having a positive anisotropy of dielectric constant ($\Delta\varepsilon=7$). The first alignment film 41 and the second alignment film 42 used were each a horizontal alignment film subjected to a rubbing alignment treatment. The pre-tilt angle of the liquid crystal molecules 21 with respect to the surface of the active matrix substrate 10 and the pre-tilt angle thereof with respect to the surface of the counter substrate 30 were each about 4°. The alignment treatments were performed to the alignment films such that the difference between the inclination azimuth of the liquid crystal molecules 21 with respect to the surface of the active matrix substrate 10 and the inclination azimuth of the liquid crystal molecules 21 with respect to the surface of the counter substrate 30 was 180°.

The counter substrate 30 sequentially includes the second substrate 31, the color filters 32 and the black matrix 33, a 1.5-μm-thick resin layer as the second dielectric layer 36, a 1.5-μm-thick resin layer as the third dielectric layer 37, a 100-nm-thick ITO electrode as the third electrode 34, and a 2-μm-thick resin film as the first insulating layer 35. The third electrode 34 was a solid electrode formed in the entire display region.

The first electrode 12 is disposed for each sub-pixel, is electrically connected to the corresponding TFT, and receives a different voltage for each sub-pixel from the control circuit 200. The second electrodes 14 disposed for the respective sub-pixels are electrically connected to each other. The second electrodes 14 are grounded, and the voltage (0 V) applied to the second electrodes 14 is considered as the constant voltage (common voltage). The control circuit 200 applies a common voltage to the sub-pixels. In Example 1, the control circuit 200 switched between application of alternating voltage and application of constant voltage to the third electrode 34 so as to switch the display modes, with the veil-view pattern being displayed.

Example 2

A liquid crystal display device according to Example 2 has the same structure as that of Example 1, except that the first dielectric layer 35 is not disposed between the third electrode 34 and the second alignment film 42.

Comparative Example 1

A liquid crystal display device according to Comparative Example 1 has the same structure as that of Example 1, except that the control circuit 200 does not execute an operation for providing an image using the veil-view function.

<Evaluation of Perception>

The liquid crystal display device according to Example 1 provided display in the first display mode (narrow viewing angle mode) and in the second display mode (wide viewing angle mode) while displaying a checkered pattern as the veil-view pattern. The liquid crystal display device according to Comparative Example 1 provided display in the first display mode and in the second display mode without displaying the veil-view pattern. In each of Example 1 and Comparative Example 1, in the first display mode, a common voltage was applied to the second electrodes, an alternating voltage that was 0 to about 4 V higher than the common voltage was applied to the first electrodes, and an alternating voltage that was 2.5 V higher than the common voltage was applied to the third electrode. In the second display mode in each of Example 1 and Comparative Example 1, a grayscale (intermediate grayscale) image was displayed with a common voltage applied to the second electrodes and the third electrode and an alternating voltage that was 0 to about 4 V higher than the common voltage applied to the first electrodes.

In each display mode, the perception in observation of the liquid crystal panel from the normal direction (from the front) and the perceptions in observation thereof at a polar angle of 45° and an azimuth angle of 0° (right direction), 90° (up direction), 180° (left direction), 270° (down direction), and 225° (oblique direction) were studied. The results are shown in Table 1. In Table 1, the case where characters on the display screen were perceivable was marked as Good, the case where the characters are difficult to perceive was marked with Poor, and the case where the characters could not be perceived was marked with Unacceptable.

TABLE 1

| Display mode | Example 1 | | Comparative Example 1 | |
| --- | --- | --- | --- | --- |
| | Second display mode (Wide viewing angle mode) | First display mode (Narrow viewing angle mode) | Second display mode (Wide viewing angle mode) | First display mode (Narrow viewing angle mode) |
| Soft veil-view pattern display | Present | | Absent | |
| Perception from front | Good | Good | Good | Good |
| Perception at oblique azimuth | Poor | Unacceptable | Poor | Poor |
| Perception at left-right azimuths | Poor | Unacceptable | Good | Unacceptable |
| Perception at up azimuth | Poor | Unacceptable | Good | Good |
| Perception at down azimuth | Good | Good | Good | Good |

According to the results shown in Table 1, in the wide viewing angle mode in Example 1, the characters on the display screen was perceivable from the front but was less readable in observation from the oblique direction, the left-right directions, and the up direction because the veil-view pattern was perceived. After switching to the narrow viewing angle mode in Example 1, the perception from the front was the same but was worse from the oblique direction, the left-right directions, and the up direction, to cause the characters to be unperceivable. Meanwhile, in Comparative Example 1 where the veil-view pattern was not displayed, after switching from the wide viewing angle mode to the narrow viewing angle mode, the perception in observation from the left-right directions was worse to improve the privacy, but the privacy in observation from the oblique direction and the down direction was insufficient.

In Example 1, the veil-view pattern was perceivable from the up direction, while the veil-view pattern was unperceivable from the down direction to provide good perception. Such a difference in perception between the up-down directions is presumably due to a slight difference between the tilt angle of the liquid crystal molecules with respect to the active matrix substrate and the tilt angle of the liquid crystal molecules with respect to the counter substrate, which was caused by the rubbing alignment treatments performed to the first alignment film 41 and the second alignment film 42.

(1) Mode Efficiency

Concerning each of the liquid crystal display devices according to Example 1 and Example 2, the mode efficiency in the second display mode (wide viewing angle mode) was determined by the following way. The mode efficiency is represented by the following formula (1).

Mode efficiency (%)=(maximum luminance in crossed Nicols)/(luminance in parallel Nicols)× 100 (1)

Here, the maximum luminance in crossed Nicols is the maximum luminance when a pair of polarizers is arranged in crossed Nicols relative to the liquid crystal panel, a constant voltage is applied to the second electrodes, and the voltage applied to the first electrodes is changed from 0 to about 4 V. The luminance in parallel Nicols is the luminance with no voltage applied when a pair of polarizers is arranged in parallel Nicols relative to the liquid crystal panel. The luminance of each liquid crystal display device was measured using a luminance meter SR-UL1 (available from TOPCON CORPORATION) with the liquid crystal display device placed on a white light source. The mode efficiency was determined from the normal direction of the liquid crystal panel.

Figure 19:
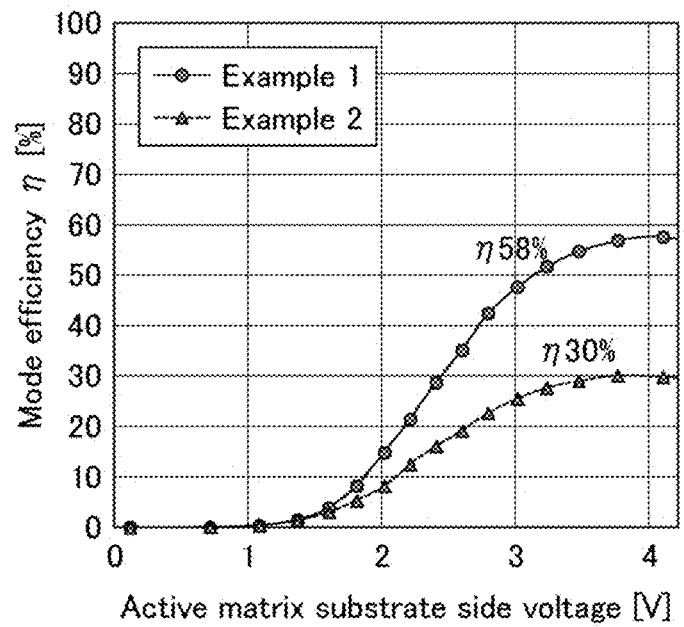
FIG. 19 is a graph showing mode efficiencies in the wide viewing angle mode in liquid crystal display devices according to Example 1 and Example 2.

FIG. 19 is a graph showing the mode efficiencies of the liquid crystal display devices according to Example 1 and Example 2 in the wide viewing angle mode. As shown in FIG. 19, in both of Example 1 and Example 2, the mode efficiency was increased along with the increase in the alternating voltage applied to the first electrodes, which means the grayscale display was achieved in the wide viewing angle mode. The maximum value of the mode efficiency in Example 1 was 58% and the maximum value of the mode efficiency in Example 2 was 30%. Example 1, employing the first dielectric layer between the third electrode and the second alignment film, presumably could reduce or prevent generation of unnecessary electric fields formed in the thickness direction of the liquid crystal layer as compared with Example 2 not employing the first dielectric layer, and thus could provide a better mode efficiency than in Example 2.

<Luminance in Black Display and in White Display>

Concerning the liquid crystal display device according to Example 1, the luminances in black display and in white display were measured by the following way. The luminances in black display (grayscale value of 0) and in white display (grayscale value of 255) in observation of the display screen from the normal direction were measured using "SR-UL1" available from Topcon Technohouse Corporation. The luminance in black display was measured with a common voltage applied to the first electrodes and the second electrodes and an alternating voltage (counter voltage) applied to the third electrode being changed from 0 to 6 V. The luminance in white display was measured with a common voltage applied to the second electrodes, an alternating voltage of 4 V relative to the common voltage applied to the first electrode, and the counter voltage being changed from 0 to 6 V.

Figure 20:
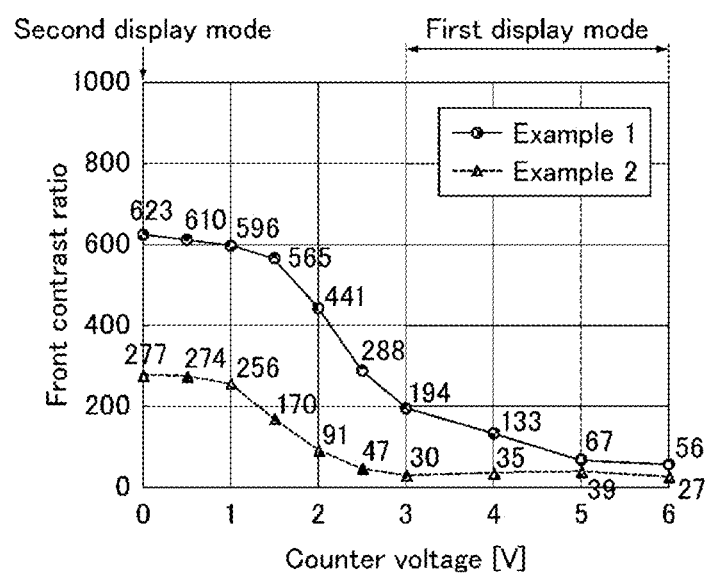
FIG. 20 is a graph showing front contrast ratios in the liquid crystal display devices according to Example 1 and Example 2.

FIG. 20 is a graph showing front contrast ratios of the liquid crystal display devices according to Example 1 and Example 2. The mode where the alternating voltage (counter voltage) applied to the third electrode is 0 V corresponds to the second display mode (wide viewing angle mode). As shown in FIG. 20, in both of Examples 1 and 2, increasing the counter voltage reduces the front contrast ratio, and applying the counter voltage can switch between the second display mode and the first display mode (narrow viewing angle mode). According to the results shown in FIG. 20, the mode where the counter voltage is 3 to 6 V may be provided as the narrow viewing angle mode.

REFERENCE SIGNS LIST

1: gate line
2: source line
3: TFT
10: active matrix substrate
11: first substrate
12: first electrode
13: first insulating layer
14: second electrode
14a: linear electrode portion
14b: opening
20: liquid crystal layer
21: liquid crystal molecule
30: counter substrate
31: second substrate
32: color filter
32B: blue color filter
32G: green color filter
32R: red color filter
33: black matrix
34: third electrode
35: first dielectric layer
36: second dielectric layer
37: third dielectric layer
41: first alignment film
42: second alignment film
61: first polarizer
61A: absorption axis of first polarizer
62: second polarizer
62A: absorption axis of second polarizer
70: sub-pixel (first sub-pixel)
70B: first blue sub-pixel
70G: first green sub-pixel
70R: first red sub-pixel
71: second sub-pixel
71B: second blue sub-pixel 71G: second green sub-pixel
71R: second red sub-pixel
72: display unit
72B: blue display unit
72G: green display unit
72R: red display unit
73: color element
100: liquid crystal panel
101: first electrode drive circuit
102: second electrode drive circuit
103: third electrode drive circuit
200: control circuit
201: image signal synthesis circuit
202: display mode selection circuit
203: third electrode application voltage switching circuit
204: database
211: raw image signal
212: image signal
213: display mode switching signal
214: first display mode selection signal
215: second display mode selection signal
216: alternating signal
217: constant voltage signal
218: veil-view display switching signal
219: veil-view pattern image signal

What is claimed is:

1. A liquid crystal display device comprising:
a liquid crystal panel including display units for displaying an image using a veil-view function; and
a control circuit configured to control image signals input to the display units,
the display units each including, among sub-pixels arranged in a matrix pattern in an in-plane direction of the liquid crystal panel, a pair of sub-pixels arranged adjacent to each other, one of the sub-pixels being a first sub-pixel selected from odd-number rows and the other being a second sub-pixel selected from even-number rows,
the liquid crystal panel sequentially including an active matrix substrate, a first alignment film, a liquid crystal layer containing liquid crystal molecules, a second alignment film, and a counter substrate,
the active matrix substrate including a first substrate, and a first electrode and a second electrode that are stacked via a first insulating layer or that face each other on the first substrate,
at least one of the first electrode or the second electrode being disposed for each first sub-pixel and for each second sub-pixel,
the counter substrate including a second substrate and a third electrode,
the control circuit being configured to switch between application of alternating voltage and application of constant voltage to the third electrode.

2. The liquid crystal display device according to claim 1,
wherein the control circuit is configured to switch between a first display mode that allows a first image to be observable in a narrow viewing angle range including a normal direction of the liquid crystal panel and a second display mode that allows the first image to be observable in a wide viewing angle range including the narrow viewing angle range, and
the control circuit is configured to apply an alternating voltage to the third electrode in the first display mode and a constant voltage common to the first electrode or the second electrode to the third electrode in the second display mode.

3. The liquid crystal display device according to claim 2,
wherein the control circuit in the first display mode inputs different image signals to the first sub-pixel and the second sub-pixel so as to allow a second image, different from the first image, to be observed in the wide viewing angle range.

4. The liquid crystal display device according to claim 1,
wherein the counter substrate includes a dielectric layer between the third electrode and the second alignment film.

* * * * *